(12) United States Patent
Agrawal et al.

(10) Patent No.: US 12,261,961 B2
(45) Date of Patent: Mar. 25, 2025

(54) CONSENSUS DATA FILTERING IN PROOF OF SPACE BLOCKCHAIN SYSTEMS

(71) Applicant: Western Digital Technologies, Inc., San Jose, CA (US)

(72) Inventors: Shashank Agrawal, Fremont, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 253 days.

(21) Appl. No.: 17/554,414

(22) Filed: Dec. 17, 2021

(65) Prior Publication Data
US 2023/0198770 A1    Jun. 22, 2023

(51) Int. Cl.
*H04L 9/32*    (2006.01)
*G06F 16/22*   (2019.01)
*H04L 9/00*    (2022.01)

(52) U.S. Cl.
CPC ........ *H04L 9/3236* (2013.01); *G06F 16/2282* (2019.01); *H04L 9/50* (2022.05); *H04L 2209/56* (2013.01)

(58) Field of Classification Search
CPC ..... H04L 9/3236; H04L 9/50; H04L 2209/56; G06F 16/2282
See application file for complete search history.

(56) References Cited

U.S. PATENT DOCUMENTS

| | | | | |
|---|---|---|---|---|
| 10,938,567 | B2 * | 3/2021 | Martino | G06Q 20/065 |
| 11,418,402 | B1 * | 8/2022 | Jakobsson | H04L 41/044 |
| 2019/0303579 | A1 * | 10/2019 | Reddy | H04L 9/3239 |
| 2020/0201910 | A1 * | 6/2020 | Gavaudan | G06Q 20/32 |
| 2022/0116225 | A1 * | 4/2022 | Cohen | H04L 9/3247 |

OTHER PUBLICATIONS

"Chia Network Consensus Explained", URL: https://manuals.plus/chia/chia-network-consensus-explained, 67 pages, May 2, 2021.

\* cited by examiner

*Primary Examiner* — Daniel B Potratz
*Assistant Examiner* — Faghia Telat Rana
(74) *Attorney, Agent, or Firm* — Barry IP Law, P.C.

(57) ABSTRACT

Blockchain systems operate over a network of computing devices. Proof of space blockchain consensus systems utilize data stored in storage devices across the computing devices within the network. These storage devices are utilized to generate and store proof of space consensus data. This data is then accessed at a later time to respond to challenges issued across the blockchain network. In order to limit successful submissions of these challenge responses, one or more filters are utilized. These filters result in only a fraction of the stored data on a storage device to be useable for solving the blockchain challenge. Attackers may attempt to circumvent this filter to increase their odds of submitting an approved solution to the blockchain challenge. In order to address this, additional data structures are stored within the storage device and are registered at the time of creation on the blockchain to make these filters more robust.

20 Claims, 15 Drawing Sheets

CONSENSUS DATA FILTERING IN PROOF OF SPACE BLOCKCHAIN SYSTEMS

FIELD

The present disclosure relates to storage systems. More particularly, the present disclosure relates to improving the available filtering techniques to enhance security in systems utilized for proof of space blockchain applications.

BACKGROUND

Storage devices are ubiquitous within computing systems. Recently, solid-state storage devices (SSDs) have become used alongside traditional magnetic storage drives. These nonvolatile storage devices can communicate and utilize various protocols including non-volatile memory express (NVMe), and peripheral component interconnect express (PCIe) to reduce processing overhead and increase efficiency.

Increasingly, these storage devices are being used within blockchain systems. Blockchain miners operate computing systems that are interconnected over a network such as the Internet and share duplicate copies of a ledger that comprises a series of data blocks that each link back to the previous block. This distributed ledger system allows for the processing of decentralized data including cryptocurrency. By utilizing various cryptographic methods on data structures shared around the network, the decentralized network can securely process data that can be relied upon for various transactions between parties. A main requirement for this to work is for the various blockchain miners on the network to all agree on using the same blockchain data. This agreement can be done through a consensus method.

Historically, the consensus method in blockchain applications was a "proof of work" consensus method. Proof of work requires that a mining computer on the blockchain network solve a series of proposed computational problems. These problems are distributed to all of the miners on the network through a challenge format. By solving the challenge, the mining computer could propose the next block to be added to the blockchain and as a reward, be issued some portion of the cryptocurrency associated with the blockchain. However, the proof of work consensus model has drawn criticism for the effects it has on the environment and the affects it has on the market for computational hardware necessary to solve the challenges.

As a result, a "proof of space" consensus method was proposed that utilizes storage space instead of computational power. Broadly, proof of space consensus involves generating and storing blockchain data on your storage device, receiving a challenge, generating an answer to that challenge utilizing the data, and providing the answer to the blockchain network for verification. The structure of the stored data and how it is processed can lead to awarding rewards in a more lottery fashion instead of awarding them to a user who has the most processing power.

As proof of space networks grow however, the number of potential solutions also scales as the data sought has been previously stored on storage devices. To prevent the proof of space blockchain network from being overrun with potential challenge solutions, the processing of these challenge answers may include one or more steps that filters out various answers as needed. These filters may also reduce the number of reads that need to be done within the storage device, which would otherwise clog up network bandwidth and reduce the chances of responding to a challenge within the available timeframe. Thus, when configured properly, only a fraction of the potential challenge solutions are usable for each challenge timeframe.

However, as the blockchain system increases in size and the blockchain rewards increase in value, there becomes more incentive for a bad-faith miner to try and circumvent the system. This can be done by figuring out a method to avoid their data being filtered. The filter can be configured to allow only a small fraction of potential solutions to be submitted for verification by the blockchain network. However, if the filter could be circumvented, the number of chances for a single miner would increase dramatically.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
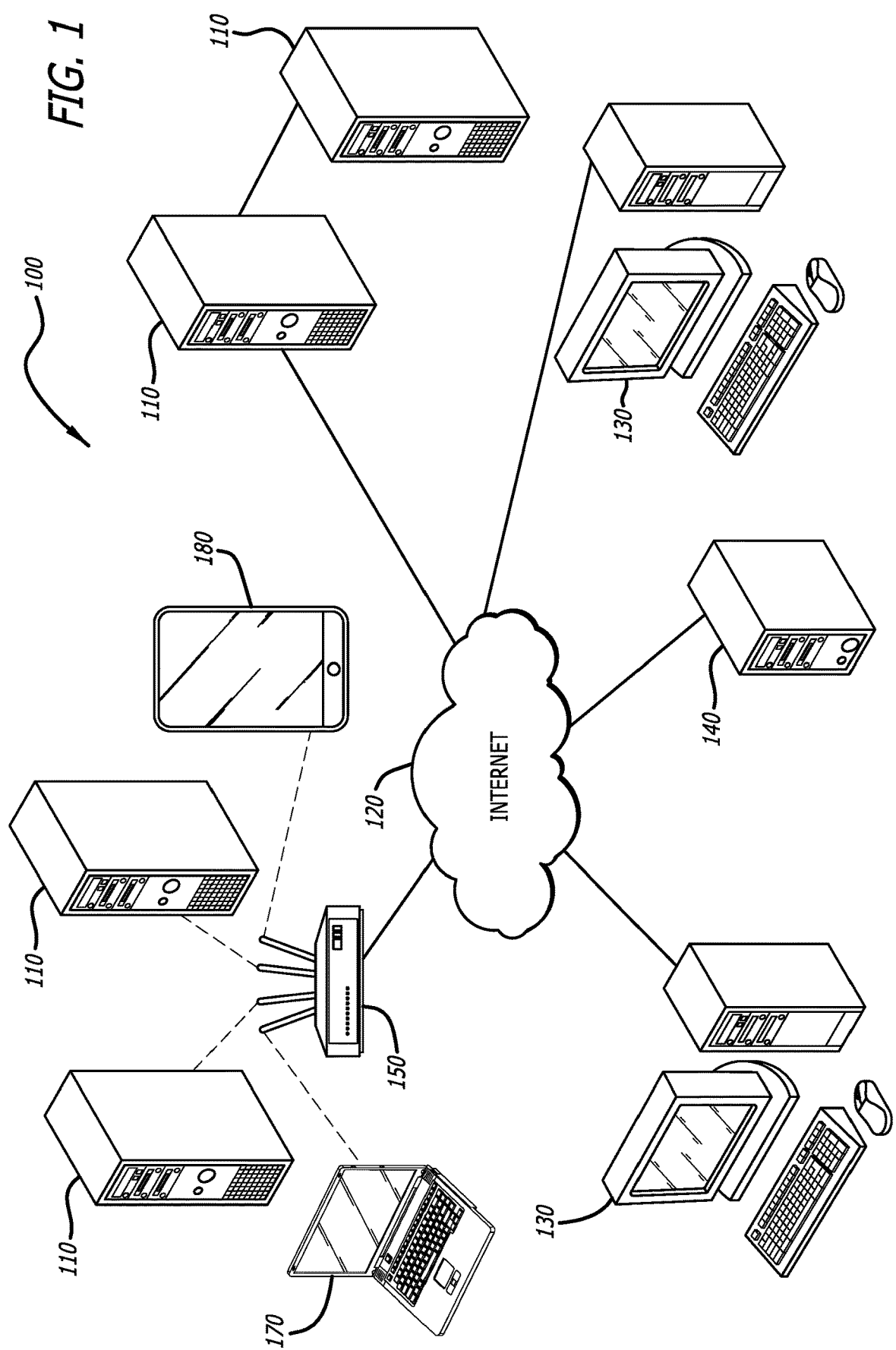
FIG. 1 is conceptual diagram of a proof of space consensus blockchain network in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that provide more robust filtering and security measures for proof of space consensus blockchain networks. More specifically, many embodiments attempt to generate additional data that is embedded within the stored data. Once stored, this additional data is registered with the blockchain for later verification that the data was stored on the miner's storage device in the past. This verification can be done through various cryptographic methods and processing of the additional data including providing a Merkle tree path of various values.

In a number of embodiments, users or miners may desire to utilize storage devices for a proof of space mining operation. One such proof of space-based blockchain network is called Chia. Chia cryptocurrency utilizes proof of space consensus methods to generate new blocks within its blockchain. This proof of space data for Chia is called a "plot." Chia plots are typically generated through a "plotting" process which requires a lot of read and write cycles within the memory devices of a storage device. Once generated however, the completed plot only needs occasional access for challenge responses. This completed plot data can be stored in a long-term storage partition which may configured to only be written to once or a few times.

In a variety of embodiments, the plotting process will include additional steps to make the future filtering and verification processes more robust against attacks and/or bad-faith miners. In many embodiments, a Merkle tree is generated based on values derived from the incoming blockchain challenge. The random challenge values correspond to data stored within the plots. As discussed in more detail below, these plots comprise a plurality of ordered tables that reference entries within a previous table back to the first table. This line of self-reference is often called a "branch" of the root table value within the plot. Each plot may have a multitude of branches, each selected via a particular value or table entry.

In additional embodiments, the Merkle tree is generated from these various branches with the input leaves being a combination of the root table value and one other value along the path of the branch. Once generated, the Merkle tree can be stored with the plot. Furthermore, the additional data may also be registered with the blockchain for later verification. Thus, when a challenge is issued in the future that allows for a valid answer being submitted from that plot, the blockchain logic may also provide a Merkle tree path to verify that the data was previously stored on the storage device in the past.

In more embodiments, the root of the Merkle tree generated for the plot may also be utilized to generate a commitment value. This commitment value may be incorporated into other aspects of the challenge submission process like the filtering step. By utilizing this commitment value in the filtering of challenge solutions, the likelihood of a bad-faith miner circumventing the blockchain process will be decreased as any solution must reference data that was previously registered with the blockchain. Because of this, attackers would not be able to simply generate various solutions that bypass the filter.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a system diagram of a proof of space consensus blockchain system 100 in accordance with an embodiment of the invention is shown. The proof of space consensus blockchain system 100 comprises a series of nodes. For example, in the Chia blockchain network, the nodes include farmers and timelords. These nodes transmit and receive data related to the proof of space consensus blockchain across various networks such as the Internet 120. While embodiments of the present disclosure may encompass any viable proof of space blockchain system, the embodiments described throughout the figures will be related to the Chia blockchain network. Therefore, it should be understood that certain embodiments described herein can be applied to other non-Chia networks as needed.

In many embodiments, various Chia node servers 110 are connected to the Internet 120 and each other. These Chia node servers 110 may communicate and transmit Chia blockchain data between each other. In addition, there may be additional types of devices that may act as farmers and/or timelords. Personal computers may have applications that act as personal computer Chia nodes 130 that are also connected to and communicate with the other Chia nodes. In some instances, a specialized device may be connected to the network that acts as a Chia timelord 140 which typically assists in validation processes.

Furthermore, connection to the network via nodes can be made wirelessly through one or more wireless access points 150 which may connect a variety of devices including more Chia node servers, portable Chia node servers 170, or personal electronic device Chia servers 180. It should be recognized by those skilled in the art that Chia node devices may come in any available form factor and that the minimum requirements are that a processor, network connection, and storage space for completed plots be present. While it is most profitable to remain connected to the proof of space consensus blockchain system 100 at all times, it should be understood that node devices may leave or connect intermittently, temporarily, or permanently.

Figure 2:
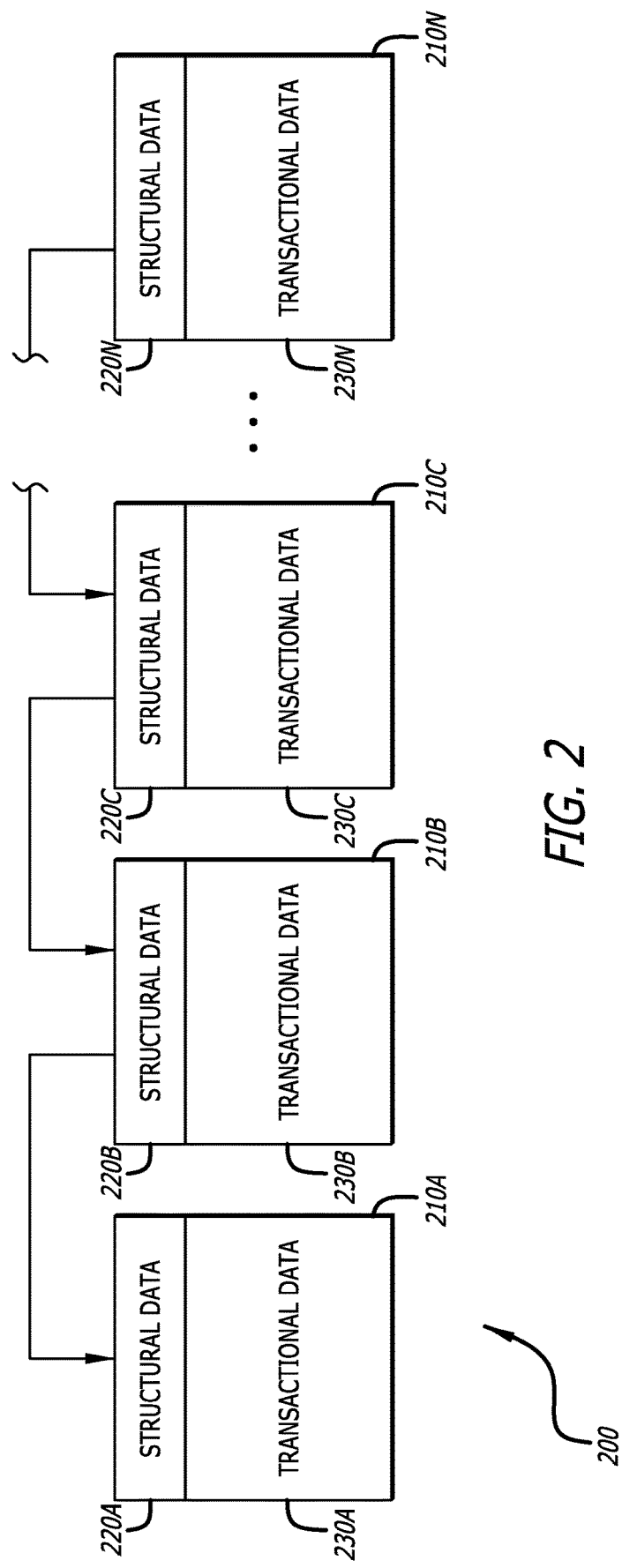
FIG. 2 is a conceptual block diagram of a blockchain.

Referring to FIG. 2, a conceptual block diagram of a blockchain 200 is shown. A blockchain 200 can be understood as a growing list of blocks which comprise records or other data. These blocks are linked together through various methods that typically involve cryptography. In many instances, each block 210A-210N (with the exception of the first, or genesis, block 210A) will comprise structural data 220A-220N including a hash related to the previous block, a timestamp, and some sort of transactional data 230A-230N.

Because each non-genesis block 210B-210N refers back to the previous block, the blockchain 200 itself becomes tamper-resistant. A network of computing devices acting as nodes each keep a copy of this blockchain 200 on their systems as a distributed ledger. This structure keeps blockchain ledgers from having a centralized controller and are thus decentralized. Thus, they have grown in popularity over the past decade and have been applied to a variety of applications such as cryptocurrency.

A major issue with blockchain systems is how the nodes all agree on what the next block in the blockchain should be. This issue is called "consensus" and can be solved in a number of ways. For example, Bitcoin utilizes blockchains and utilizes a "proof of work" consensus method. This method involves a lot of computational power from CPUs and GPUs of the various nodes. Another emerging consensus method is a "proof of space" method which instead of utilizing computations to solve challenge problems, storage space is required to prove that data has been held by the node. This data is called proof of space data and can be generated within a storage device. Discussion of this process in more detail is outlined below.

Figure 3A:
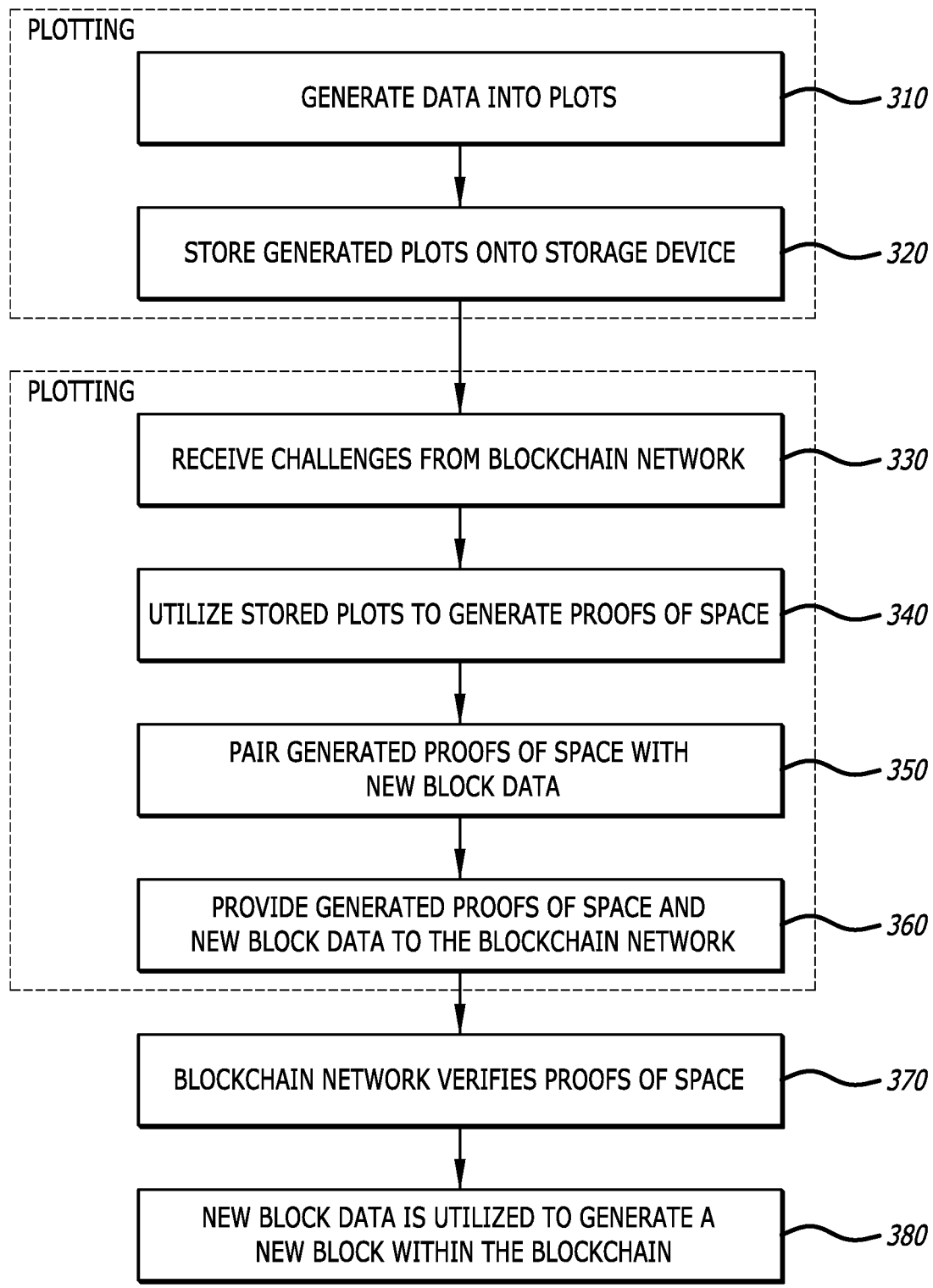
FIG. 3A is a flowchart depicting a process for mining cryptocurrency utilizing a proof of space consensus method in accordance with an embodiment of the disclosure.

Referring to FIG. 3A, a flowchart depicting a process 300A for mining cryptocurrency utilizing a proof of space consensus method in accordance with an embodiment of the disclosure is shown. As discussed above, the mining of cryptocurrency can come in many forms. In a growing number of applications, cryptocurrency that uses a consensus method of proof of space can be utilized as an alternative to the currently more popular proof of work method. One example of a blockchain-based cryptocurrency that utilizes proof of space as a consensus method is Chia. Chia is centered on creating (i.e., "plotting") large quantities of proof of space consensus data that is formatted into one or more "plots." These plots are then stored on a hard drive for future accessing by the online Chia blockchain network. The plots comprise a series of hashed tables which may be accessed by the Chia network in response to a challenge posed by the network. This process of storing the plots and providing them to the online Chia network for challenge processing is called "farming."

In a typical proof of space blockchain process 300A the plotting stage can begin by generating data into plots (block 310). Although Chia utilizes plots, some embodiments may be able to be formatted for use within other proof of space-based blockchain-based systems. In many embodiments, the generation of plot data involves the creation of a plurality of tables comprising cryptographic hashes that may be nested, self-referential, or otherwise related. In various embodiments, the hashes created through a back propagation method and are then sorted and compressed throughout the tables. The plots are completed and stored onto a storage device (block 320). This generation of plots creates a lot of input and output processes within the storage device and benefits from high-speed storage devices. This results in many users utilizing SSDs for plotting operations. However, the nature of many SSDs and their finite endurance leads to many users copying the generated plots to a secondary storage device that is more configured for long-term storage.

The farming stage of proof of space consensus blockchain system comprises all of the remaining steps. Farming can begin by receiving one or more challenges from the blockchain network (block 330). The exact type of challenge may vary based on the cryptocurrency process used. For example, the challenge may be a problem that must be solved within a certain time and/or in a particular format. The process 300A can utilize the stored plots to generate proofs of space (block 340). This step is described in more detail within the discussion of FIG. 3B. These proofs of space are required of the challenge answers that allow the user to attempt to add their contribution to the blockchain and reap a reward. In a variety of embodiments, the generated proofs of space are paired with new block data (block 350). New block data can include a proposed data block to add to the blockchain. Those skilled in the art will understand that this new block data may be comprised of sub-blocks or any other proposed block data as required by the blockchain being utilized.

The paired proofs of space and new block data is transmitted onto the blockchain network (block 360). The transmitted data is not automatically added to the blockchain but needs to satisfy one or more requirements as more than one user on the network may have submitted a valid proof to the challenge. During the selection of a potential new block, the blockchain network will verify the submitted proofs of space (block 370). This can be done in a variety of ways depending on the exact blockchain used. Once the blockchain network has settled on a particular block candidate that was submitted, the new block data is utilized to generate new block within the blockchain (block 380).

Figure 3B:
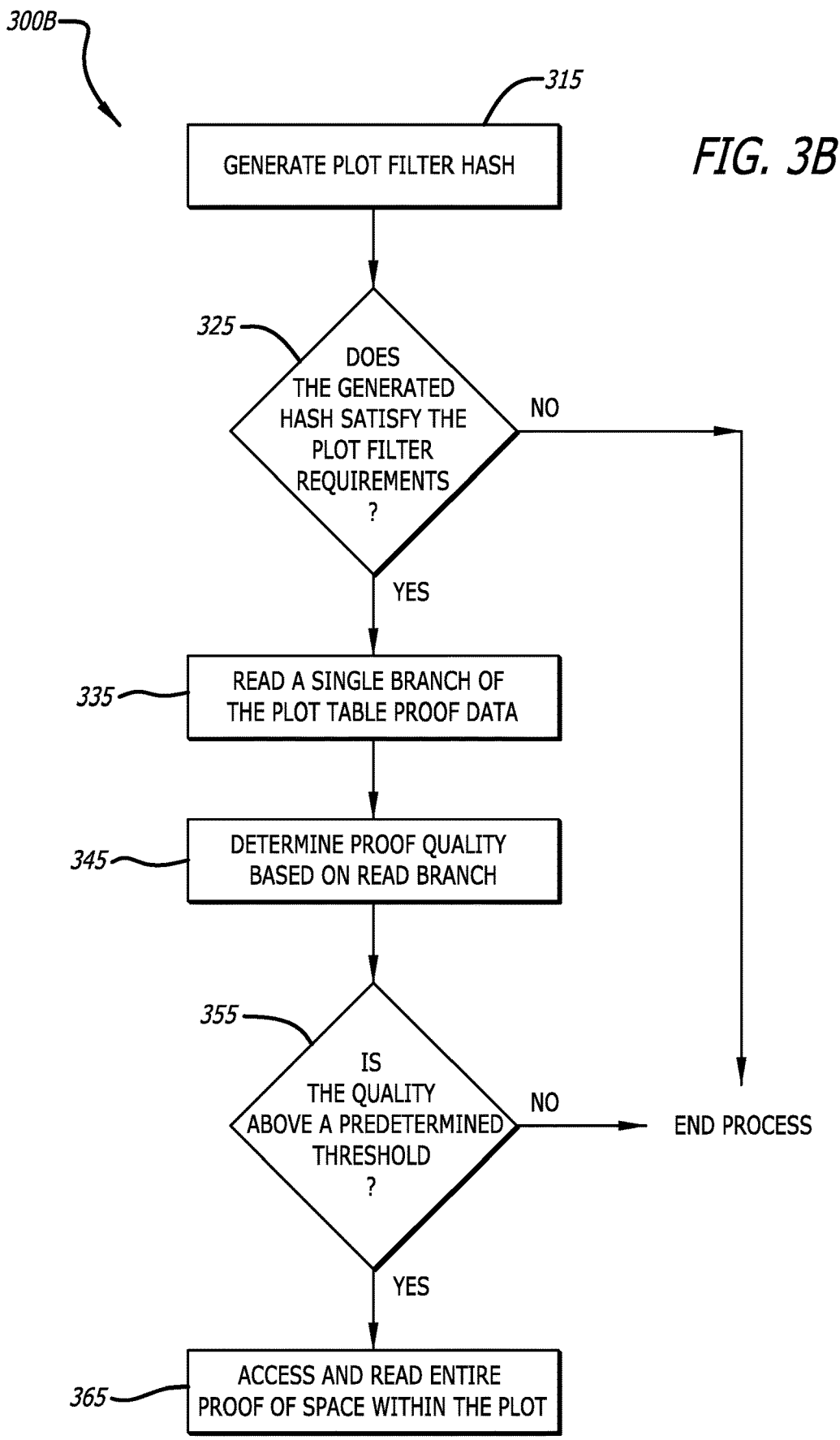
FIG. 3B is a flowchart depicting a process for filtering and qualifying proofs of space in accordance with an embodiment of the disclosure.

Referring to FIG. 3B a flowchart depicting a process 300B for filtering and qualifying proofs of space in accordance with an embodiment of the disclosure is shown. As an example of how proofs of space are generated, the embodiment in FIG. 3B depicts how a proof of space is generated in the Chia blockchain. The proof of space data in Chia is called a "plot" and is a stored series of related tables of data values. The Chia node device generates this plot and stores it within a storage device. To identify each plot, a unique plot identification number is generated. This plot identification number can be generated through various means including, but not limited to, hashing a public pool key and a private pool key.

Additionally, the blockchain network will issue challenges in the form of challenge data to the nodes. These challenges will create a race for the various nodes to generate a solution to the challenge. A node that generates a viable solution will add a proposed next block of data to the blockchain and transmit both to the rest of the nodes on the blockchain network. If the proposed solution is accepted, the proposed new block will be added to the blockchain. The administrator of the winning node will then be rewarded for this by being issued some amount of cryptocurrency from the blockchain. In the Chia network, the winning node is issued Chia currency.

Within the Chia blockchain network, challenges are related to certain windows of opportunity. In this way, when challenge data is issued, there is a limited time to respond to the challenge before a new challenge is issued. This is typically done to reduce the ability of node administrators to cheat and either overtake the blockchain or gain rewards without storing data. One of the ways the Chia networks marks elapsed time in relation to challenges is to provide and transmit signage points related to each individual chain within the network. Thus, when a potential solution to a challenge is generated, it must also incorporate some reference to the current signage point.

The process 300B may take various pieces of data to create a plot filter hash (block 315). A blockchain network may have a large number of nodes that each contain a large number of plots. In order to keep the network from being overrun with superfluous challenge solutions, and to add an additional layer of security, a filter may be used to restrict the number of plots that may be used for solution generation. This plot filter can be formatted as a requirement associated with various aspects of the plot that must be met. For example, various data values related to the plot can be concatenated or added together which can then be hashed to generate a unique value.

Typically, in Chia, the plot hash filter is generated by hashing the sum of the plot identification number, the current challenge data, and the current signage point data. However, as discussed in more detail below, many embodiments of the current disclosure utilize the plot identification number, challenge data, signage point data, and commitment data. This commitment data will be described in more detail below, but it can be generally understood to be a value that helps prove that a Chia node has actually stored the value for a particular length of time.

This unique plot filter value can then be examined to see if it meets the requirement (block 325). For example, in the Chia network currently, the resultant SHA256 plot filter hash number must start with nine zeroes (i.e., have nine leading zeros). If the plot filter hash value does not satisfy these conditions, then the process of evaluating this plot can finish and proceed on a new plot. However, if the filter requirements were met, then the process 300B can evaluate the "quality" of the plot.

As described in more detail below within the discussion of FIG. 5, Chia plot data is typically configured to store a plurality of tables. These tables hold various data values. Additionally, the last table in the plurality of tables has a value inside. This value can be utilized to backpropagate and reference an entry within the previous table of the plot. This process can repeat until a value within the first table of the plot is reached. Currently, Chia tables have 32 entries in each table, but any number can be acceptable.

Instead of reading the entire plot, a quality check can be done by selecting a single initial value and reading just that branch that runs back to the initial table (block 335). Quality data may be a string that is used as a shorthand to evaluate the plot as a whole. In some embodiments, the initial entry for the quality data generation is based on the currently received challenge data. In this way, a bad-faith node administrator cannot simply evaluate the quality of the plots beforehand and gain a speed advantage. The result data read from the single branch can be hashed to generate a single quality string value. This quality string value can determine the overall proof of quality of the plot for this challenge (block 345).

If the quality of the plot is not above a certain predetermined threshold, the evaluation of that plot can end and move onto a new plot (block 355). However, if the quality of the plot is above the predetermined threshold, a proof of space challenge solution can be generated. This potential solution will require the entire plot to be read. The process 300B can then access and read the entire proof of space within the plot (block 365). In some embodiments, the predetermined threshold is a value that has been generated by the Chia blockchain network timelords. In a number of these embodiments, that value is the required iterations that must have been performed between the last block addition or signage point transmission.

Figure 4:
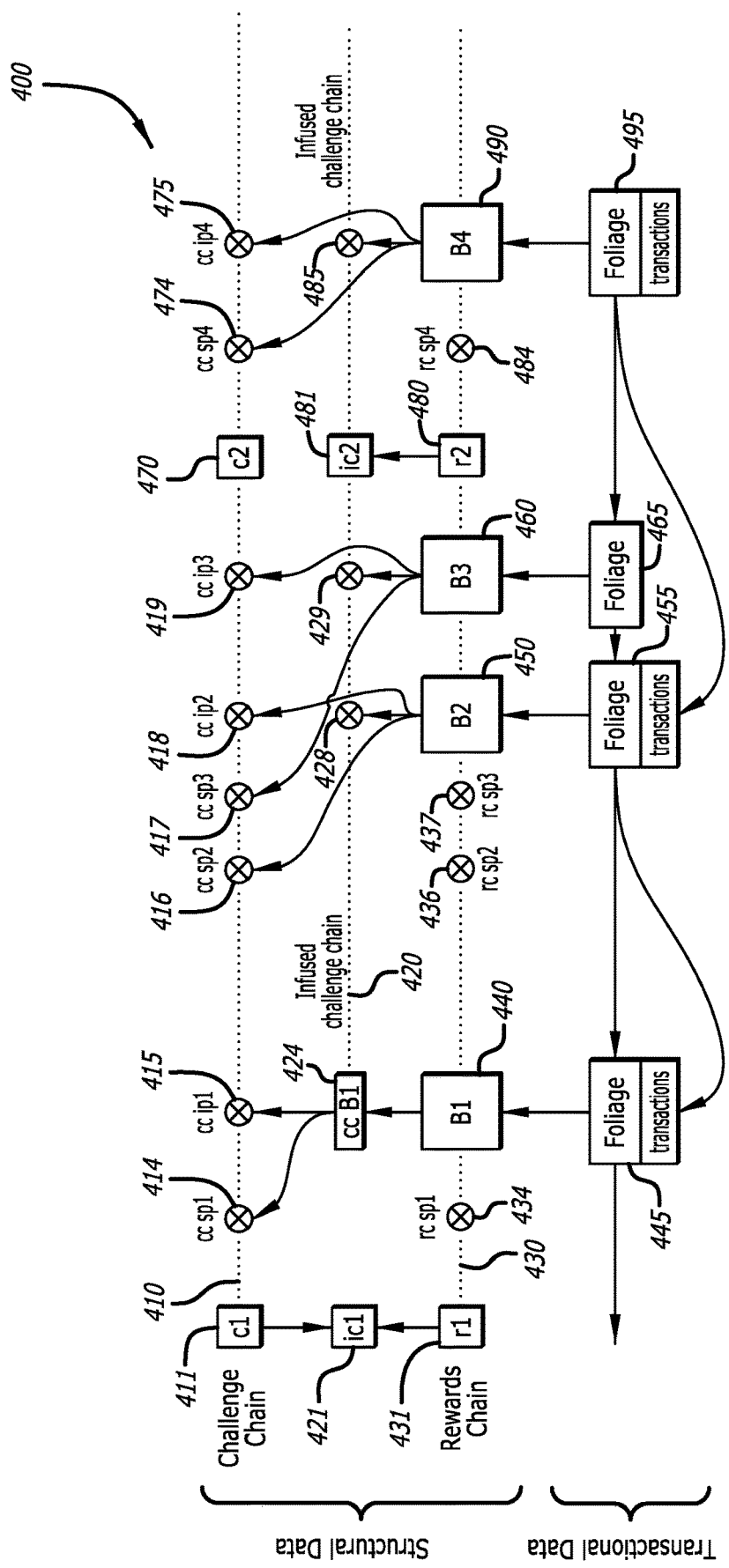
FIG. 4 is a conceptual diagram of new blocks being added to a Chia blockchain in accordance with an embodiment of the disclosure.

Referring to FIG. 4, a flowchart depicting a process 400 for mining cryptocurrency utilizing a proof of space consensus method is shown. Specifically, the process 400 depicted in the embodiment of FIG. 4 is an exemplary proof of space and time blockchain process using the Chia cryptocurrency. At a high level, Chia is mined based on the amount of storage space devoted to it, rather than processing power. It should be appreciated that any other cryptocurrency that relies on storage space may be used or otherwise substituted with respect to the systems and methodologies discussed herein, including by way of non-limiting example, FileCoin, Signum Network and/or Spacemesh. Similar to the typical blockchain process described above with respect to FIG. 2, the process 400 utilizes a successive series of structural data and paired transactional data over a series of blocks that are added over time.

The design of the structural data includes three different "chains" of data that reference and depend on each other in various ways that allow for the secure and decentralized nature of the proof of space method. These chains may be understood in certain contexts as each being a verifiable delay function which are executed concurrently, wherein each chain serves a different purpose. The blocks themselves are associated with a rewards chain 430 while the issued challenges are associated with a challenge chain 410. A third infused challenge chain 420 is utilized for facilitating various challenges and security measures necessary for adding blocks to the blockchain. Each of these chains have certain markers that indicate the end of a period of time. These points along the chain are typically uniform in time together. The time elapsed between two adjacent points is typically referred to as a sub-slot.

The challenge chain has a first challenge chain point c1 411 and a second challenge chain point c2 470. Likewise, the rewards chain has a first rewards chain point r1 431 and a second rewards chain point r2 480. Finally, the infused challenge chain 420 has a first infused chain point ic1 421 and a second infused challenge chain point ic2 481. The arrows in FIG. 4 indicate that the generation of the receiving point is dependent on the sending point. So, for example, in FIG. 4, the infused challenge point 1 is dependent on and/or generated from one or more values within the challenge point c1 411 and the rewards chain point r1 431. The distance between these two points on the x-axis equates to a period of time. The distance between these two sets of points is the sub-slot for this process 400. In many embodiments, the sub-slot corresponds to a fixed number of iterations of one or more verifiable delay functions. This may vary depending on adjusted difficulty, but often is variable to provide a somewhat fixed period of time between sub-slots. For example, the Chia blockchain is currently configured to have ten-minute sub-slots processing windows.

Each sub-slot within the challenge chain 410 and reward chain 430 is divided into a number of smaller verifiable delay functions. In a number of embodiments, the number of smaller verifiable delay functions is sixty-four. In between each of these smaller verifiable delay functions, one or more signage points exist, such as rewards chain signage point 1 434. Within the Chia blockchain network, the timelords publish the output and proof of the smaller verifiable delay functions when a signage point is reached. At each signage point (and including at each challenge point), a challenge in the form of challenge data is broadcast across the blockchain network for processing.

Farmers within the blockchain network can begin by processing that challenge as described above with reference to FIG. 3. For example, a challenge may be issued at challenge chain c1 411 across the Chia network. At least one farmer within the network begins to process a valid solution to this challenge. At some later point, a viable solution is found, and that solution is transmitted back to the network along with a potential new block B1 440 to add to the blockchain. To verify that this block is acceptable, the proposed solution must include a proof that associates the block with both the challenge chain signage point sp1 414, and the challenge chain infusion point 415. Infusion points can be understood as points along the various chains where it is expected that a provided challenge should have an answer. In practice, the time between signage points and their corresponding infusion points are windows of opportunity to answer the challenge. The exact time allowed on these windows can vary based on a number of conditions. For example, in the Chia blockchain system, various factors can be adjusted such that only about thirty-two viable proof of space solutions are submitted to the blockchain network for approval.

The first block approved within a sub-slot can also serve as the first infused challenge chain block B1 424. In order to avoid certain attacks and increase overall blockchain security, the remaining blocks to be added within this sub-slot will have to provide a proof that references this first infused challenge chain block in some fashion.

As more time processes, another challenge chain signage point sp2 416 is released to the blockchain network. Likewise, a corresponding rewards chain signage point sp2 436 is also broadcast out. Farmers begin processing that challenge. However, it is not necessary that one issued challenge be completed before another challenge is issued. For example, in FIG. 4, challenge chain infusion point sp3 419 is broadcast out to the blockchain network before the next block is added that depends on the challenge chain signage point sp2 416. Similarly, another corresponding rewards chain signage point sp3 437 is also released. This is acceptable in various proof of space consensus methods including Chia.

In the embodiment depicted in FIG. 4, a farmer has provided block B2 450 to the network which is added to the rewards chain 430. Block B2 450 provides one or more proof of space solutions that incorporate, or otherwise reference the original challenge chain signage point sp2 416 and the current challenge chain infusion point ip2 418 as well as the current infused challenge chain iteration 428. A short time later, another farmer proved block B3 460 which is also added to the rewards chain 430 and itself incorporates one or more proofs implicating or otherwise referencing challenge chain signage point sp3 417, challenge chain infusion point ip3 419 and the infused challenge chain iteration 429.

As those skilled in the art will recognize, blocks may be added in any number, and speed depending on the operation of the blockchain network. For example, in current Chia blockchains, approximately thirty-two blocks may be added between sub-slots. However, fewer blocks are shown in the embodiment of FIG. 4 for space and clarity reasons. However, it is contemplated that more blocks and activity may be happening during these periods of time.

Upon completion of the sub-slot, the Chia timelords can issue another challenge point c2 470 and corresponding rewards chain point r2 480. In typical sub-slots, the infused challenge chain would be temporarily ended by generating an infused challenge point that is dependent upon both the correspond challenge and rewards chain points. However, in certain sub-slots, there may be scenarios where the number of blocks added is insufficient. In these cases, such as the embodiment depicted in FIG. 4, the infused challenge chain point ic2 481 may only be dependent upon the rewards chain point r2 480. In this way, the infused challenge chain 420 can continue for use in the following block to be added, block B4 490.

Comparable to the previously added blocks B2 450 and B3 460, new block B4 490 provides one or more proof of space solutions that incorporate, or otherwise reference the challenge chain signage point sp4 474 (which was issued alongside corresponding rewards chain signage point sp4 484), and the current challenge chain infusion point ip4 475 as well as the current infused challenge chain iteration 485. Each of the added blocks in the process 400 included various transactional data along with their structural data.

In Chia terms, the added transactional data is referred to as "foliage." In many embodiments, foliage data can include details regarding what the reward was for the block, who earned the reward, and where the reward should be issued. As described in more detail below, various data regarding the plots of Chia farmers may be incorporated and added in this section. Data regarding transactions may also be added which acts as a cryptocurrency. Each block is required to have some foliage data, but not every block is required to have transaction data.

With respect to the process 400 depicted in FIG. 4, the first block B1 440 is associated with a first transactional data 445 which includes one or more transactions. Likewise, block B2 450 includes a second transactional data 455 which also includes one or more transactions. The foliage of the second transactional data 455 refers back to the foliage of the first transactional data 445 and the transactions. The block B3 460 included foliage in the respective third transactional data 465 but did not comprise any transactions. The foliage of the third transactional data 465 again references back to the second transaction data 455. Finally, block B4 490 includes a fourth transactional data 495 which comprises foliage and one or more transactions. The foliage of the fourth transaction data 495 references back to the foliage of the third transactional data 465, but also references back to the previous transactions which were within the second transactional data 455. Each proof of space solution generated for this process 400 must be obtained from previously stored data on one or more storage devices on a node within the blockchain network. The structure of that data in many embodiments is discussed below in more detail.

Figure 5:
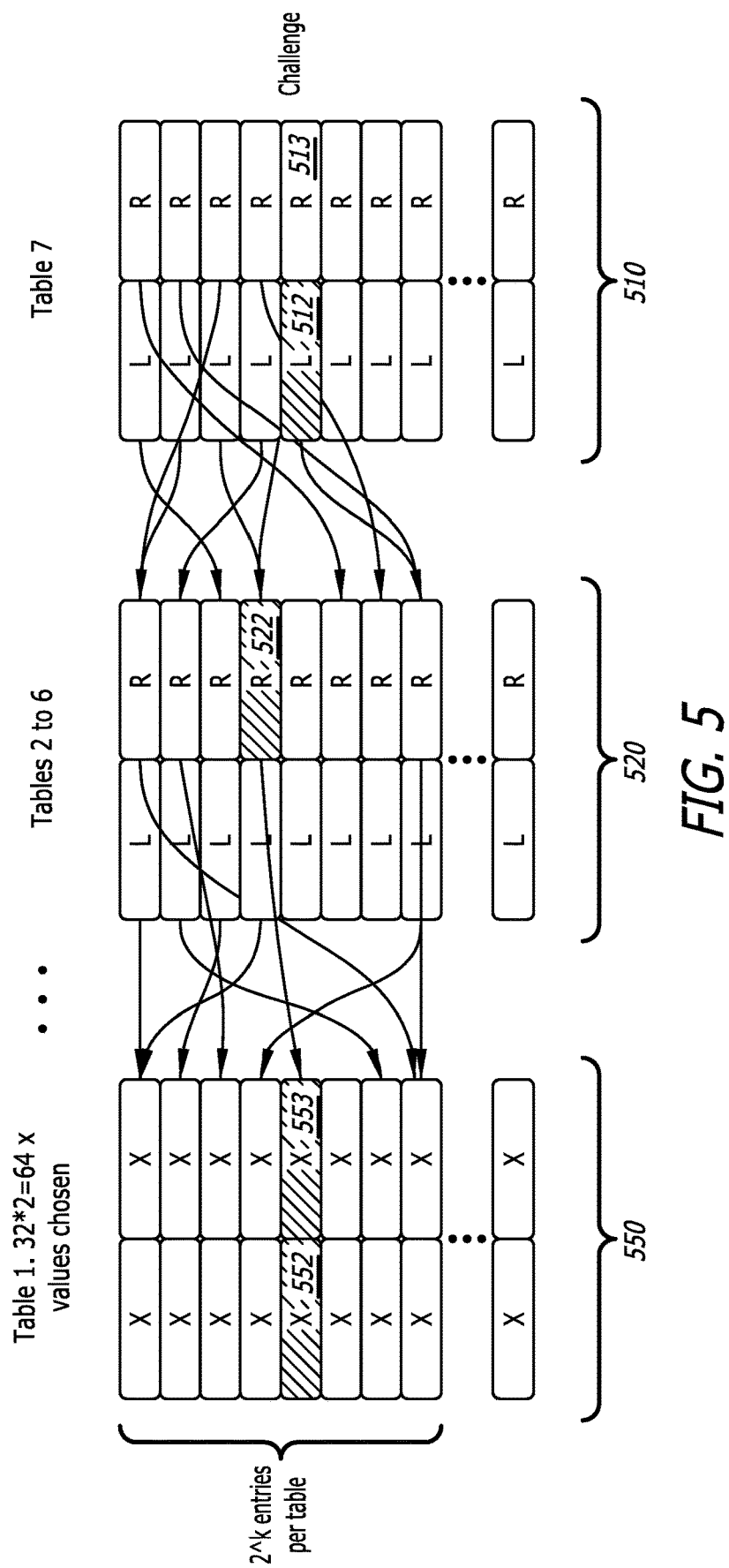
FIG. 5 is a conceptual depiction of a plurality of hash tables for use in a Chia blockchain in accordance to an embodiment of the disclosure.

Referring to FIG. 5, a conceptual depiction of a plurality of hash tables for use in a Chia blockchain in accordance to an embodiment of the disclosure is shown. As described above with respect to the discussion of FIG. 3B, the plot data may include a plurality of tables 510, 520, 550. These tables 510, 520, 550 may be organized in a sequential manner with a first table 550, last table 510, and ordered tables 520 in between. In many embodiments, Chia plot data will have seven tables, but it is contemplated that other sizes are available. The last (7th) table 510 will be comprised of a series of values. The challenge data may indicate that a first value 512 and second value 513 are being requested for evaluation.

To check the quality of the plot, a single value and the resultant backpropagated values can be read, combined, and hashed. The first value 512 is selected as the quality candidate. In a number of embodiments, the selection of which value to evaluate for quality is based on the current challenge data. The first value 512 references a next entry 522 in table 6. The value of the entry in table 6 references an entry within table 5 and so forth until a final pair of entries is referenced. These final two entries 552, 553 are just two entries out of the sixty-four entries that will be part of the quality evaluation. If the plot has a sufficient quality evaluation, all sixty-four entries and their associated backpropagated values will be read for the proof of space potential solution.

Figure 6:
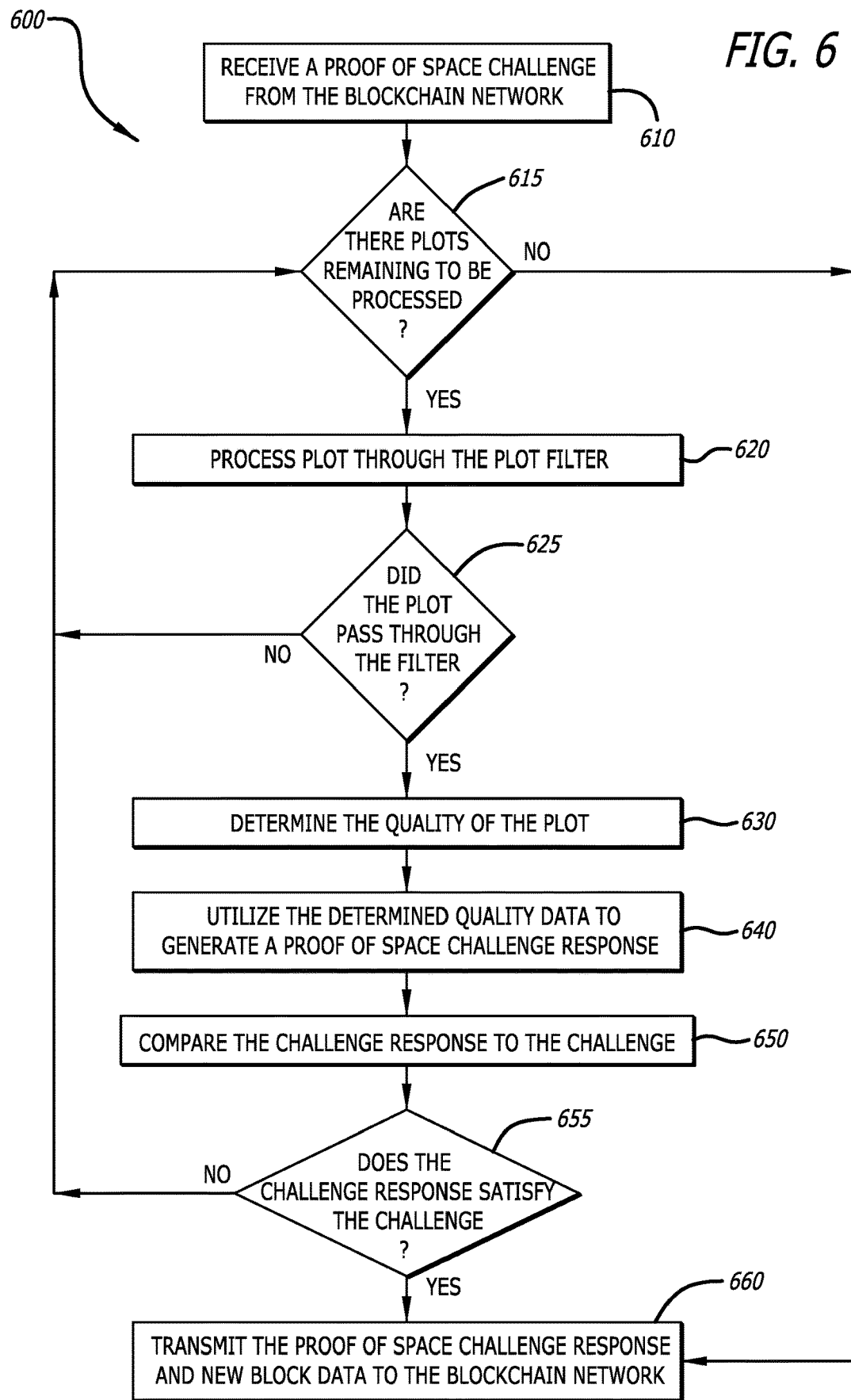
FIG. 6 is a flowchart depicting a process for responding to challenges within a Chia blockchain network in accordance with an embodiment of the disclosure.

Referring to FIG. 6, a flowchart depicting a process 600 for responding to challenges within a Chia blockchain network in accordance with an embodiment of the disclosure is shown. Understanding all we have discussed previously, a more detailed process 600 for handling challenges within the Chia blockchain system is outlined below. Upon setting up a plurality of plots within one or more storage devices, the Chia blockchain node can first receive a proof of space challenge from the blockchain network (block 610). In many embodiments, the challenge will be in the form of challenge data that is generated by Chia timelords. Once received the Chia node may determine if there are any plots to be process (block 615).

When a plot if available for evaluation, a number of embodiments first pass the plot through a plot filter (block 620). As discussed previously, various embodiments utilize different points of data including a commitment value to generate a single hashed value that is evaluated to determine if it meets the requirements of the plot filter and passed (block 625). If the current plot did not pass through the filter, then the process 600 can determine if another plot is remaining to be processed (block 615).

However, if the current plot under evaluation did pass through the plot filter, the process 600 can determine the quality of the plot (block 630). As discussed above, the quality of the plot is often judged based on the values from a single selected branch of the tables stored within the plot. If the quality of the plot is sufficient, then the quality data can be utilized to generate a proof of space challenge response for submission (block 640). This can typically be done by doing a full read of the plot data referenced by the challenge. The resulting proof of space challenge response is then compared to the actual challenge (block 650).

The process 600 can process this to determine if the challenge response proof of space satisfies the challenge (block 655). In many embodiments, the challenge provides a fixed number of required iterations that have been done to a specific data set. If the generated proof of space challenge response has a required iterations value that is less than that of the challenge, then the proof of space solution is viable. A viable proof of space challenge response can be paired with new block data and transmitted to the blockchain network (block 660). If the challenge response does not satisfy the challenge, then the process 600 can evaluate the next plot (block 615). Each plot is analyzed in this manner until all plots within the node have been evaluated.

Figure 7:
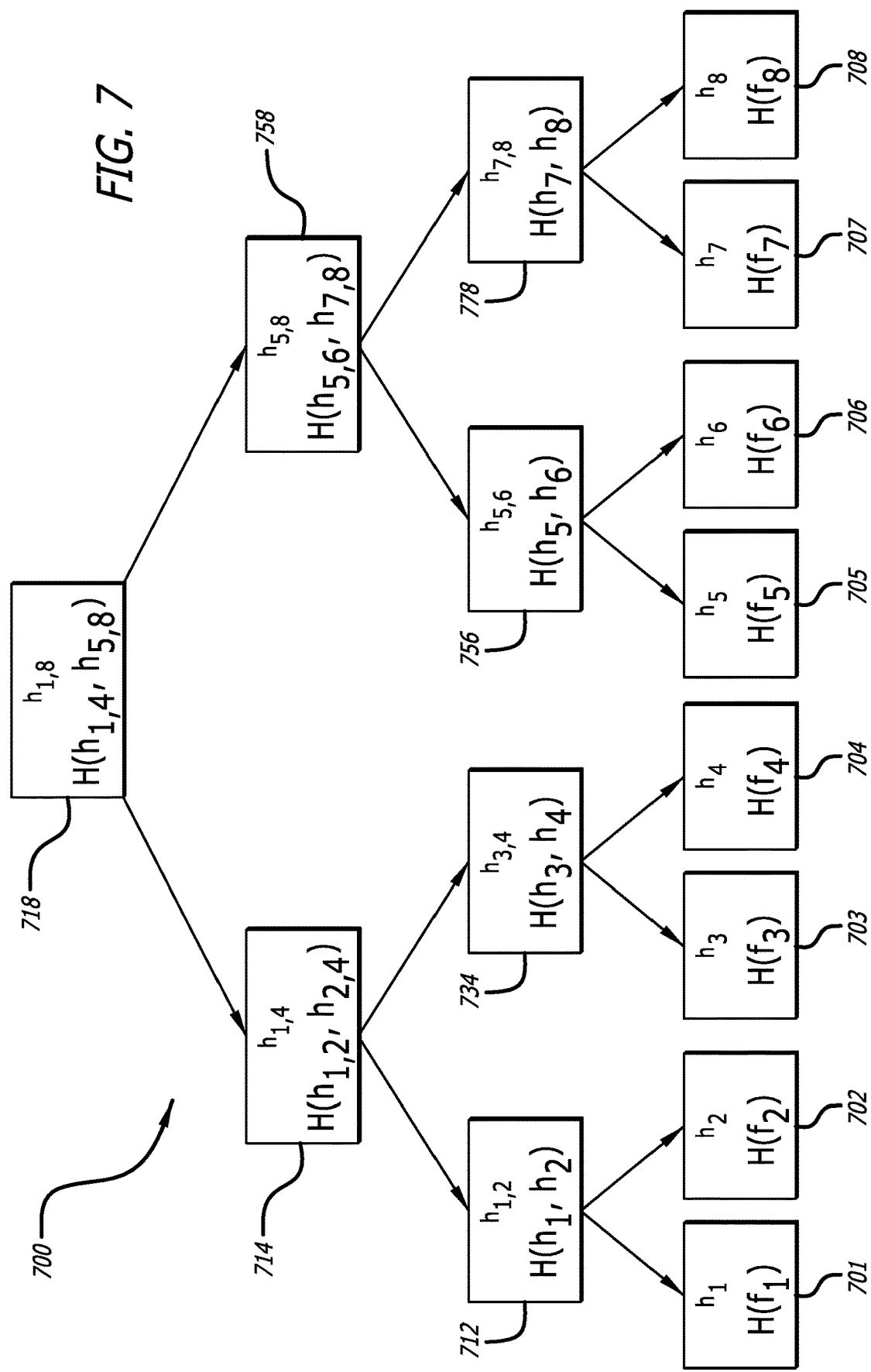
FIG. 7 is a conceptual illustration of a Merkle tree structure.

Referring to FIG. 7, a conceptual illustration of a Merkle tree structure is shown. Up until this point, we have referenced that embodiments of the present disclosure utilize a plot filter that has a commitment value. The commitment value may be generated in a variety of ways. In certain embodiments, the commitment data is a value derived from a Merkle tree that is associated with the plot data. An example Merkle tree 700 is explained herein.

Merkle trees consist of a series of nested cryptographic hash functions whose outputs are themselves hashed again until there is a single root hash value. Cryptographic hash functions are a function that can map data of an arbitrary size to an output of a fixed size. This fixed size output is typically referred to as a hash value or simply a "hash." Hash functions are unique in that they are a one-way function, which creates easy methods of computing an output from any input, but also makes it hard or virtually impossible to generate an input based on the hash output. Cryptographic hash functions are also typically deterministic, meaning that the same input will always yield the same output. This makes hashing useful in various applications such as cryptocurrency.

The example Merkle tree 700 has a series of input leaves that are hashed together until a single root hash 718 of all previous sub-hashes. The input leaves in the example Merkle tree 700 can vary depending on the desired application, but in this example, eight files (denoted as $f_1$-$f_8$) are hashed (denoted as a function of H (fN)) to create the input leave hashes $h_1$ 701, $h_2$ 702, $h_3$ 703, $h_4$ 704, $h_5$ 705, $h_6$ 706, $h_7$ 707, and $h_8$ 708. These input leave hashes are paired and hashed again. For example, input leave hash $h_1$ 701 is paired with $h_2$ 702 to create a new hash $h_{1,2}$ 712. Likewise, input leave hashes $h_3$ 703 and $h_4$ 704 are paired to create a new hash $h_{3,4}$ 734, input leave hashes $h_5$ 705 and $h_6$ 706 are paired to create new hash $h_{5,6}$ 756, and input leave hashes $h_7$ 707 and $h_8$ 708 are paired to create new hash $h_{7,8}$ 778.

These newly created hashes are again paired and hashed again. Hash $h_{1,2}$ 712 and $h_{3,4}$ 734 are hashed together to make combined hash $h_{1,4}$ 714. Likewise, hash $h_{5,6}$ 756 and hash $h_{7,8}$ 778 are hashed together to create combined hash $h_{5,8}$ 758. These combined hashes $h_{1,4}$ 714 and $h^{5,8}$ 758 are themselves hashed together again to create the root hash $h^{1,8}$ 718.

Figure 8:
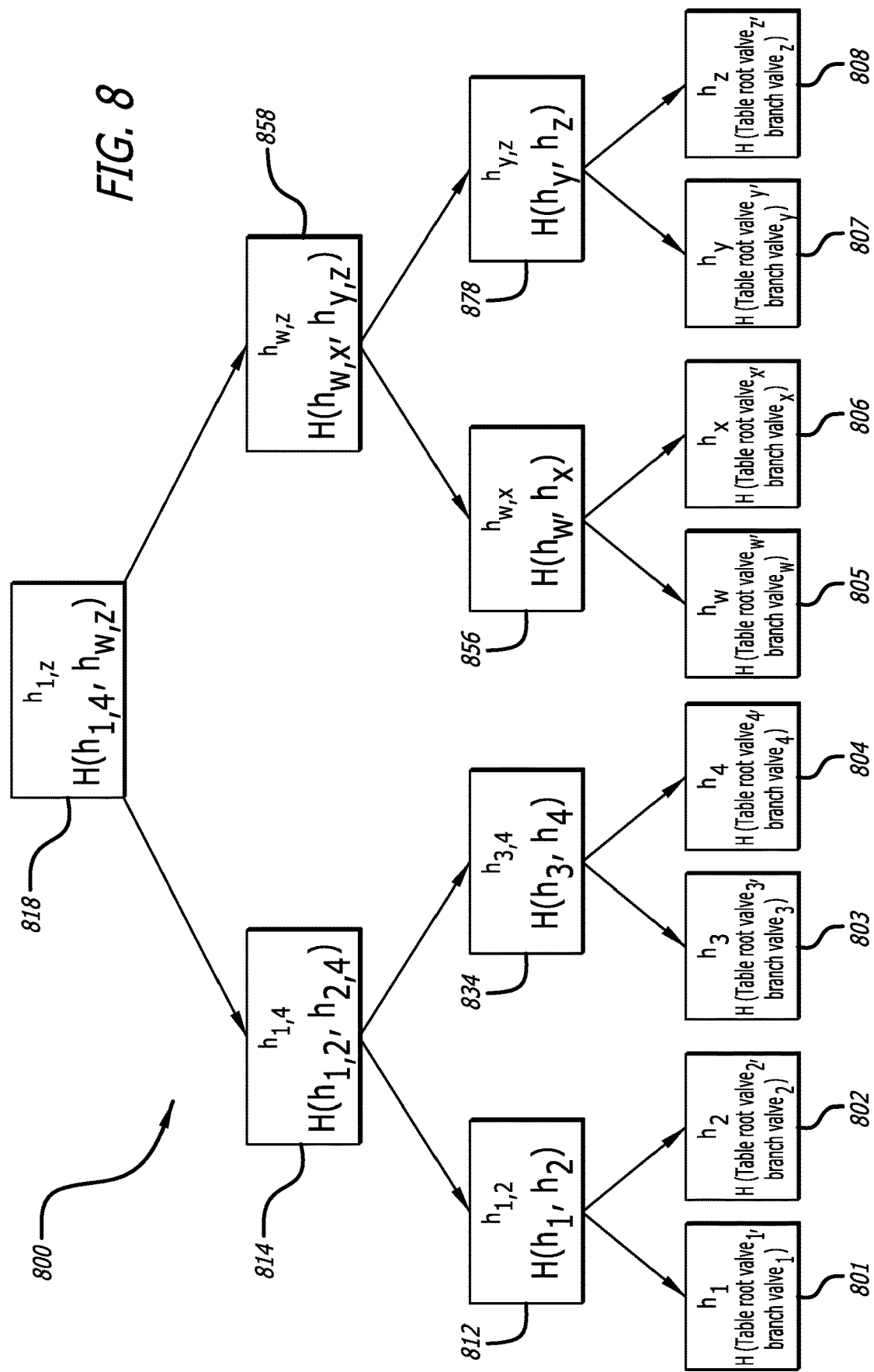
FIG. 8 is a conceptual illustration of a Merkle tree structure for use within a secured Chia blockchain network in accordance with an embodiment of the disclosure.

Referring to FIG. 8, a conceptual illustration of a Merkle tree structure 800 for use within a secured Chia blockchain network in accordance with an embodiment of the disclosure is shown. Similar to the Merkle tree example of FIG. 7, many embodiments may utilize a modified Merkle tree that utilizes pairs of values as the input leaves instead of files. Within the embodiment depicted in FIG. 8, there are also 8 input leaves hashes $h_1$ 801, $h_2$ 802, $h_3$ 803, $h_4$ 804, $h_w$ 805, $h_x$ 806, $h_y$ 807, and $h_z$ 808. Similar to FIG. 7, the left half of the Merkle tree structure 800 includes input leave hash $h_1$ 801 being paired with $h_2$ 802 to create a new hash $h_{1,2}$ 812. Likewise, input leave hashes $h_3$ 803 and $h_4$ 804 are paired to create a new hash $h_{3,4}$ 834. Further, hash $h_{1,2}$ 812 and $h_{3,4}$ 834 are hashed together to make combined hash $h_{1,4}$ 814.

The pairs of numbers utilized for the may include, but are not limited to, table root values and a respective value derived from one or more branches from that table root value. For example, a table root value may be one of the selected values within the plurality of trees of a stored plot that is associated with a received challenge. As seen during the evaluation of plot quality, a single value may be selected and that backpropagated branch can be examined. Therefore, various embodiments may utilize one of the values stored within that branch. In some embodiments, the numerically smallest value within the branch may be selected as the branch value. Those skilled in the art will recognize that many more potential combinations exist.

As such, 8 different values are read from the plot and the branch values are determined based on the received challenge. Table root value and branch values are hashed together to create the hash $h_1$ 801. Likewise, root value$_2$ and branch value$_2$ are hashed together to create the hash $h_2$ 802, root values and branch values are hashed together to create the hash $h_3$ 803, and root value and branch values are hashed together to create the hash $h_1$ 801.

The remaining table root values w-z are also utilized as leaf inputs on hashes $h_w$ 805, $h_x$ 806, $h_y$, 807, and $h_z$ 808. Although the Merkle tree depicted in FIG. 8 utilizes 8 inputs, the use of letter subscripts indicates that the size of the Merkle tree may vary and can increase in the number of hashes and combined hashes that are created. The primary requirement for this Merkle tree is that a resultant root hash 818 is generated. Therefore, hashes $h_w$ 805 and $h_x$ 806 are utilized as inputs for hash $h_{w,x}$ 856 and hashes $h_w$ 805 and $h_z$ 808 are paired as inputs to create hash $h_{y,z}$ 878. These combination hashes are themselves combined into hash $h_{w,z}$ 858 which is itself combined with hash $h_{1,4}$ to create the root hash of $h_{1,2}$ 818.

In a number of embodiments, a Merkle tree utilizing these inputs may be embedded or otherwise stored with the generated plot. In certain embodiments, the Merkle tree data may be added to the table data within the plots. In further embodiments, the Merkle tree data may be separate from the plot data. As shown in more detail below with respect to FIG. 12, the inclusion of a Merkle tree with the plot data can allow for the generation of a Merkle tree path which can aid in proving that a user has stored the plot data for a particular length of time and help thwart specialized attacks on the blockchain that may attempt to generate fraud. A more detailed explanation of this process is described below.

Figure 9:
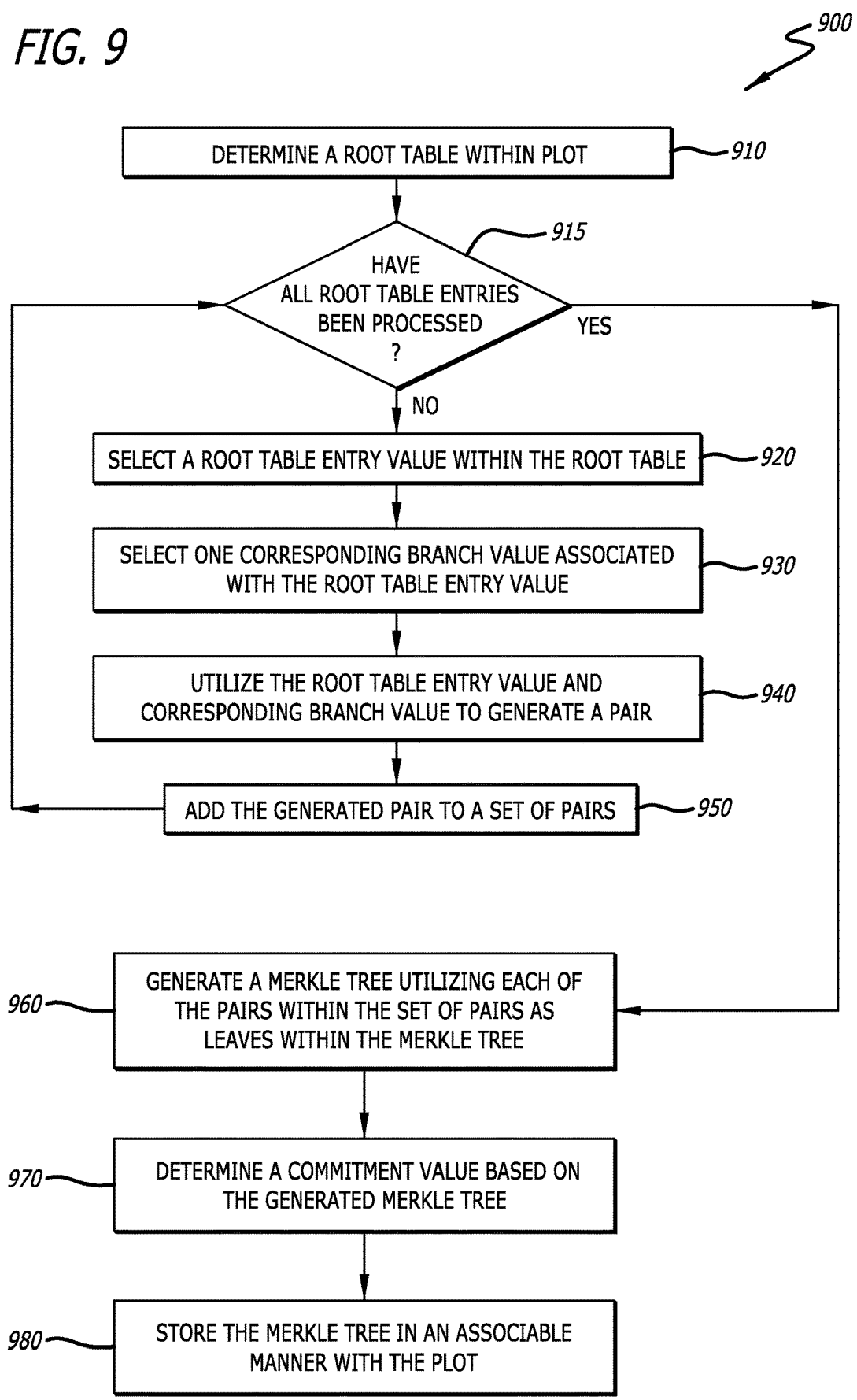
FIG. 9 is a flowchart depicting a process for incorporating Merkle tree formatted data within a Chia plot in accordance with an embodiment of the disclosure.

Referring to FIG. 9, a flowchart depicting a process 900 for incorporating Merkle tree formatted data within a Chia plot in accordance with an embodiment of the disclosure is shown. In various embodiments, the process 900 can begin by determining a root table within a plot (block 910). As discussed above, Chia plot data typically comprises a plurality of ordered tables. The last table includes a set of values which reference another entry in the previous table, which itself references back to an entry in another previous table and so forth until values within the first table are referenced. A root table can be understood as the last table within the plurality of tables that has the first entry in the backpropagation chain or "branch" within the plot.

Typically, a plurality of root table entries need to be processed. Often, this is in response to a received challenge that references a group of the root table entries. The process 900 can determine if all of the referenced root table entries have been processed (block 915). If there are still remaining root table entries to process, one of the root table entry values can be selected (block 920). The process 900 can then traverse the branch stemming from the selected root table entry. In a number of embodiments, one of the values within that branch are selected and then associated with the root table entry (block 930). For example, the process 900 may compare each of the branch values found and select the entry with the smallest numerical value. However, any type of selection process may occur. Further example include, but are not limited to, selections which are closest numerically to the root table entry (or any other associated plot specific value), the final entry within the first table, or selections which have the highest numerical value.

Once selected and associated, the root table entry value and the corresponding selected branch value are utilized to generate a pair for later use in the Merkle tree generation (block 940). Once paired, the values may be added to an overall generated set of pairs (block 950). The process 900 may then determine if any further root table entries are required for processing (block 915). This process typically repeats itself for each of the referenced table entries. Upon all root table entries being processed, the generation of the Merkle tree may commence utilizing each of the pairs within the set of pairs as input leaves (block 960). In further embodiments, the process 900 may utilize only a particular set of pairs. For example, if a challenge request references thirty-two root table values, then thirty-two pairs will be generated. However, a Merkle tree with only four or eight input pairs may be needed. Thus, the process 900 may select for example, the first four and last four pairs for the Merkle tree generation. Other selections may be possible as desired.

Once generated, the resulting root value of the Merkle tree can be utilized to generate a commitment value (block 970). This commitment value, which in many embodiments is utilized in the Chia plot filter process, can simply be the root hash value. However, in additional embodiments, the root hash value may be further processed to arrive at a commitment value. Such processing may include taking only a portion of the resulting root hash value, and/or performing further arithmetical operations to arrive at a unique value.

Once a commitment value has been determined, the process 900 can store the Merkle tree value in an associable manner with the plot (block 980). As described above, an associable manner allows for a variety of methods for storage as the stored data only needs to be referenced or otherwise associated upon access of the plot. In some embodiments, the Merkle tree data is stored within the plot data file(s). In further embodiments, the Merkle tree data is stored at a separate file, and maybe even in a separate location.

In some instances, the generation of Merkle tree data may need to be bolstered or otherwise incorporated with another security measure. For example, many embodiments may utilize a method to avoid an incentive for bad-faith Chia miners to generate a plethora of root hash values and keep trying them until one worked. An example of how to circumvent such an attack is described below.

Figure 10:
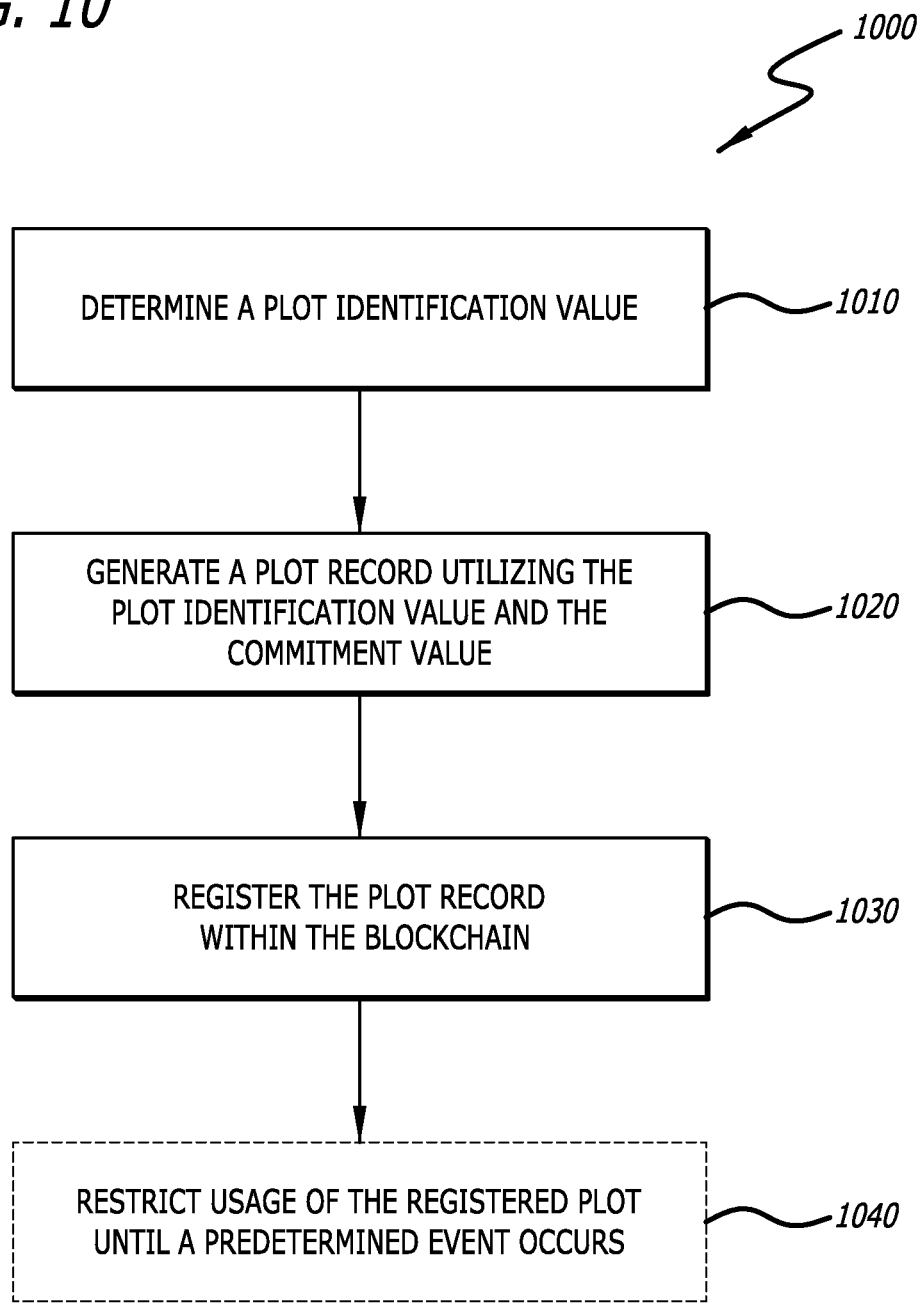
FIG. 10 is a flowchart depicting a process for generating and registering a plot record in accordance with an embodiment of the disclosure.

Referring to FIG. 10, a flowchart depicting a process 1000 for generating and registering a plot record in accordance with an embodiment of the disclosure is shown. As described above, a plot identification value can be generated in a variety of ways. Typically, the plot identification value is generated in such a way that it is unique to the specific plot. This can be done by hashing a global value and a value that is local to the specific Chia miner, mining hardware, or pool processing identifier. In a variety of embodiments, the process 1000 can determine a specific plot identification value for each plot (block 1010).

Next, a plot record can be generated by utilizing the plot identification value for the current plot and the previously determined commitment value (block 1020). In some embodiments, the plot identification value and the commitment value can be concatenated together and hashed to generate this plot record value. In other embodiments, the plot identification value and the commitment value may be added together or otherwise arithmetically manipulated prior to hashing. The resultant plot record incorporates data that is related to both the unique plot identifier, and the associated Merkle tree data as well.

The process 1000 may then register the plot record within the blockchain itself (block 1030). This can be done as transactional data in many embodiments. However, the structural data of the Chia blockchain may be changed to accommodate for this increased data being stored within. By registering the plot record values, computational processes can be done in the future which can indicate that the a specific plot and associated Merkle tree were present within a Chia miner's storage devices at this time. This can prevent attackers from attempting to add quickly generated plot data to the Chia network.

In a variety of optional embodiments, the process 1000 may also restrict the usage of the registered plot until a predetermined event occurs (block 1040). In this way, another roadblock for would-be attackers is incorporated because by the time that a newly registered block is added to the blockchain, new challenges have been issued, which prevents the attack from knowing what future challenges will present. In some embodiments, the predetermined even can be related to the amount of height in the blockchain. Often, the term "height" in relation to cryptocurrency is utilized as a measure of how many blocks have been added to the blockchain. Therefore, the Chia system may be configured to reject proposed challenge solutions from a plot until the height of the blockchain. However, it should be understood by those skilled in the art that any suitable for delaying the use of the newly registered plot. For example, a time-related value may be utilized within the Chia plot filter process. An example of this type of process is described below.

Figure 11:
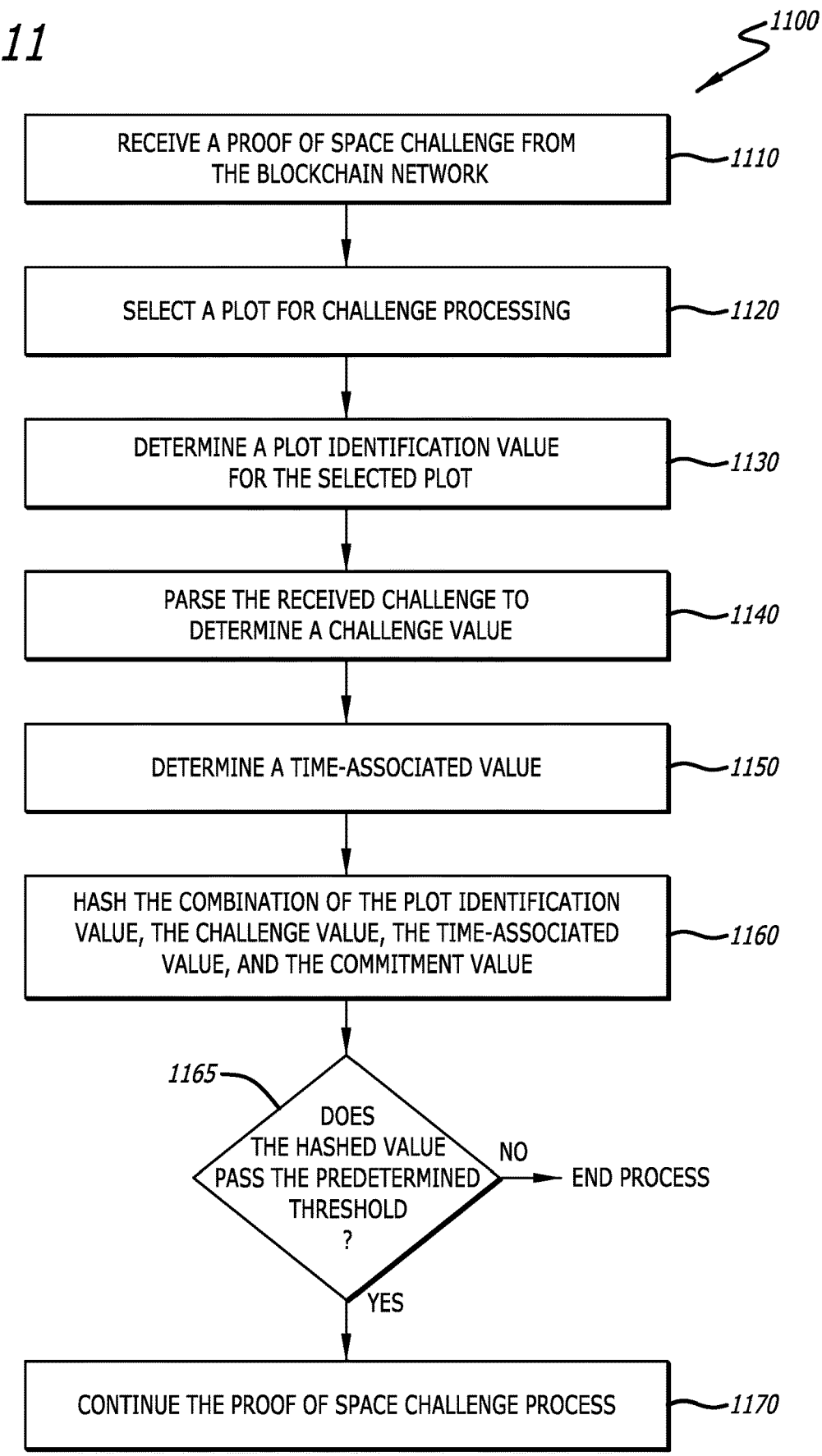
FIG. 11 is a flowchart depicting a process for utilizing a commitment value to securely process Chia blockchain challenges in accordance with an embodiment of the disclosure.

Referring to FIG. 11, a flowchart depicting a process 1100 for utilizing a commitment value to securely process Chia blockchain challenges in accordance with an embodiment of the disclosure is shown. In many embodiments, the process 1100 receives a proof of space challenge from the blockchain network (block 1110). Once received a plot can be selected for processing the challenge (block 1120). As with previous methods, the process 1100 can determine a plot identification value for the selected plot (block 1130).

In a number of embodiments, the challenge is parsed to determine a challenge value (block 1140). This challenge value can be a reference to a plurality of entries within the last table of the plot. In further embodiments, the challenge value may simply be a direct part of the challenge data received from the Chia timelords. The challenge value can simply be a numerical representation or other identification that can be associated with the currently issued challenge.

Additionally, a time-associated value can be determined (block 1150). This may be in any format or source as long as it represents some value of time. As discussed above, blockchains typically always grow by adding blocks to the blockchain. This number of blocks can be identified as a number called "height." Thus, the current height of the blockchain can be associated with an elapse of time, allowing for the blockchain height to be representative of the passage of time.

In many embodiments, the process 1100 can hash the combination of the plot identification value, the challenge value, the time-associated value, and the commitment value (block 1160). This resulting hash will be associated with many different aspects of the Chia mining process. The increased intermingling and hashing of these types of values helps to prevent attacks as mimicking all of these values would become increasingly difficult.

Once hashed, the process 1100 can pass the generated hash value through the plot filter. A determination can be made to see if the hashed value passes the predetermined threshold (block 1165). If the hash value does not pass the Chia filter, the process 1100 may end. However, if the resultant hash does pass the Chia filter, the process 1100 can continue the proof of space challenge processing system (block 1170).

Figure 12:
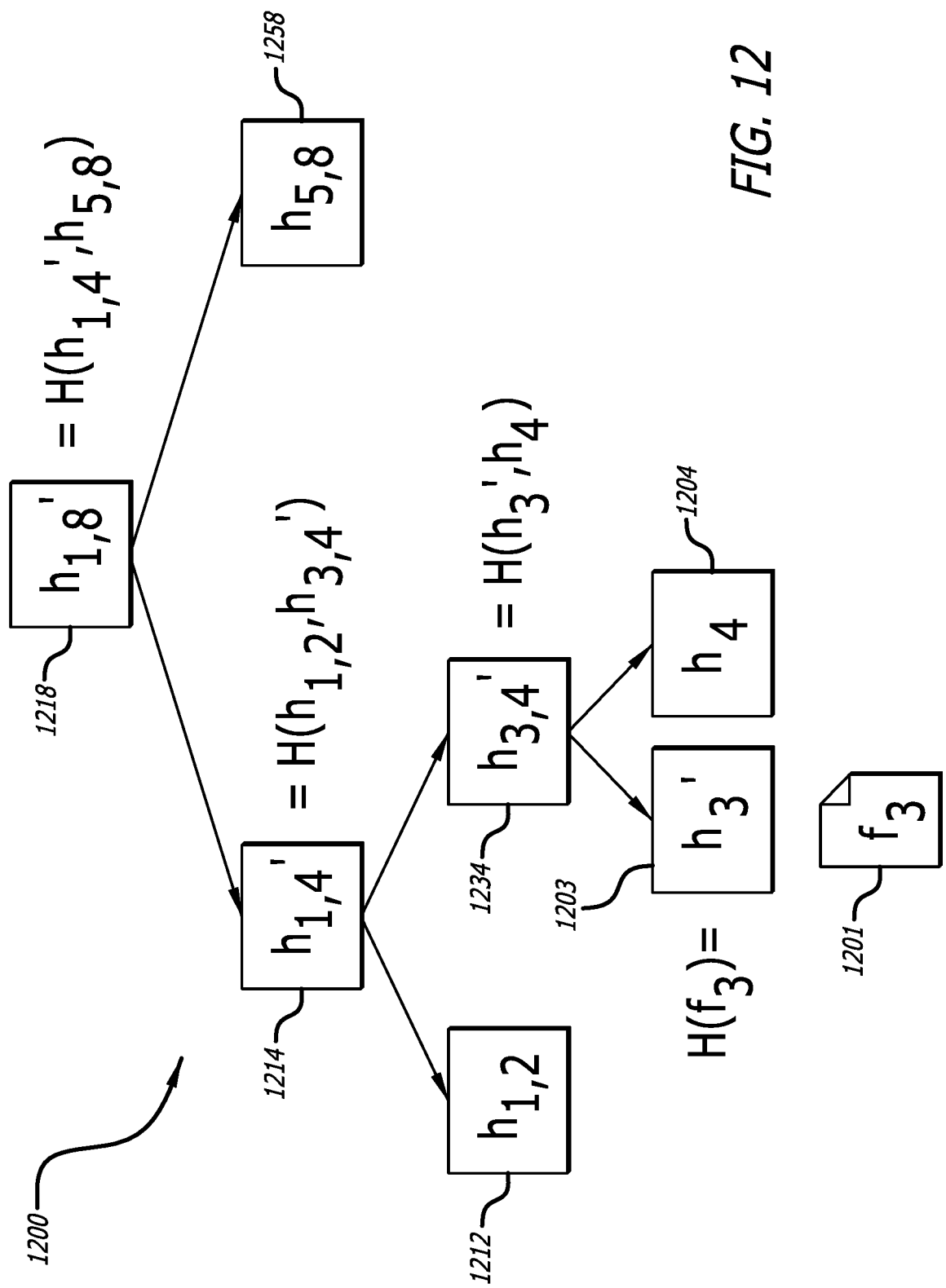
FIG. 12 is a conceptual diagram depicting how a Merkle tree path may be generated in accordance with an embodiment of the disclosure.

Referring to FIG. 12, a conceptual diagram depicting how a Merkle tree path may be generated in accordance with an embodiment of the disclosure is shown. As discussed above, a commitment value can be generated from a Merkle root tree hash, or even simply be the value of the root hash itself. The commitment-based Merkle tree would also, in many embodiments, be embedded or otherwise associated with a respective Chia plot. The original inputs of the embedded Merkle tree would typically be values derived from the plot itself. Once established, the Merkle tree can be used at later times to prove that a user previously had the data stored on their storage device. A way this can be achieved is through the sharing of a Merkle tree path (also known as a Merkle proof) from the embedded Merkle tree.

As discussed above, the embedded Merkle tree is generated based on the root values of the last table of the plot data and another associated value within the branch that stems from the root value. In many embodiments, the associated value is the smallest numerical value within the branch. However, other associated values are possible.

When a node generates a viable proof of space solution, a number of embodiments described herein can require that the viable proof of space is consistent with the previously generated commitment value. This can be done by revealing a Merkle tree path for both the current challenge (which indicates a root value of the plot data) and the associated value within the branch. By requiring this step, it can be ensured that a proposed viable proof of space has not simply generated a random Merkle root value. To provide and verify a Merkle tree path, the root hash value needs to be derived from a value that must have been utilized in creating the Merkle tree in the past before the current challenge was issued.

A Merkle tree path can be generated by providing a single input leaf value(s) and other hash values such that you can work your way up the Merkle tree until you are able to generate a root hash. If the generated root hash matches the previously generated root hash, then it can be recognized that the input value(s) was present in the original Merkle tree, proving that the plot was not generated just for this challenge to circumvent the consensus network. In the embodiment depicted in FIG. 12, the Merkle tree path 1200 is derived from having the original data (indicated as $f_3$ 1201) which can be hashed to generate $h_3'$ 1203. The Chia node can provide the original hash $h_4$ 1204 which can be combined with hash $h_3'$ 1203 to generate a combined hash of $h_{3,4}$ 1234. The node further provides hash $h_{1,2}$ 1212 which is hashed together with has $h_{3,4}$ 1234 to generate hash $h_{1,4}$ 1214. The node again provides the missing piece of the combined hash $h_{5,8}$ 1258 which can be paired with hash $h_{1,4}$ 1214 to replicate the root hash $h_{1,8}$ 1218.

Once the root hash has been replicated, it can be compared to the original root hash to see if there is a match.

Because of the avalanche effect of hashes that create large changes in output values from even small changes in input values, a match between the replicated root hash and the known root hash indicates that the input values are correct and were a part of the plot data when the plot was generated, satisfying a requirement of the proof of space consensus method. Additionally, it should be recognized by those skilled in the art that the size of the Merkle tree in this example was simplified for illustrative purposes and that the size and number of inputs on a Merkle tree can expand as needed to encapsulate all of the plot data.

Figure 13:
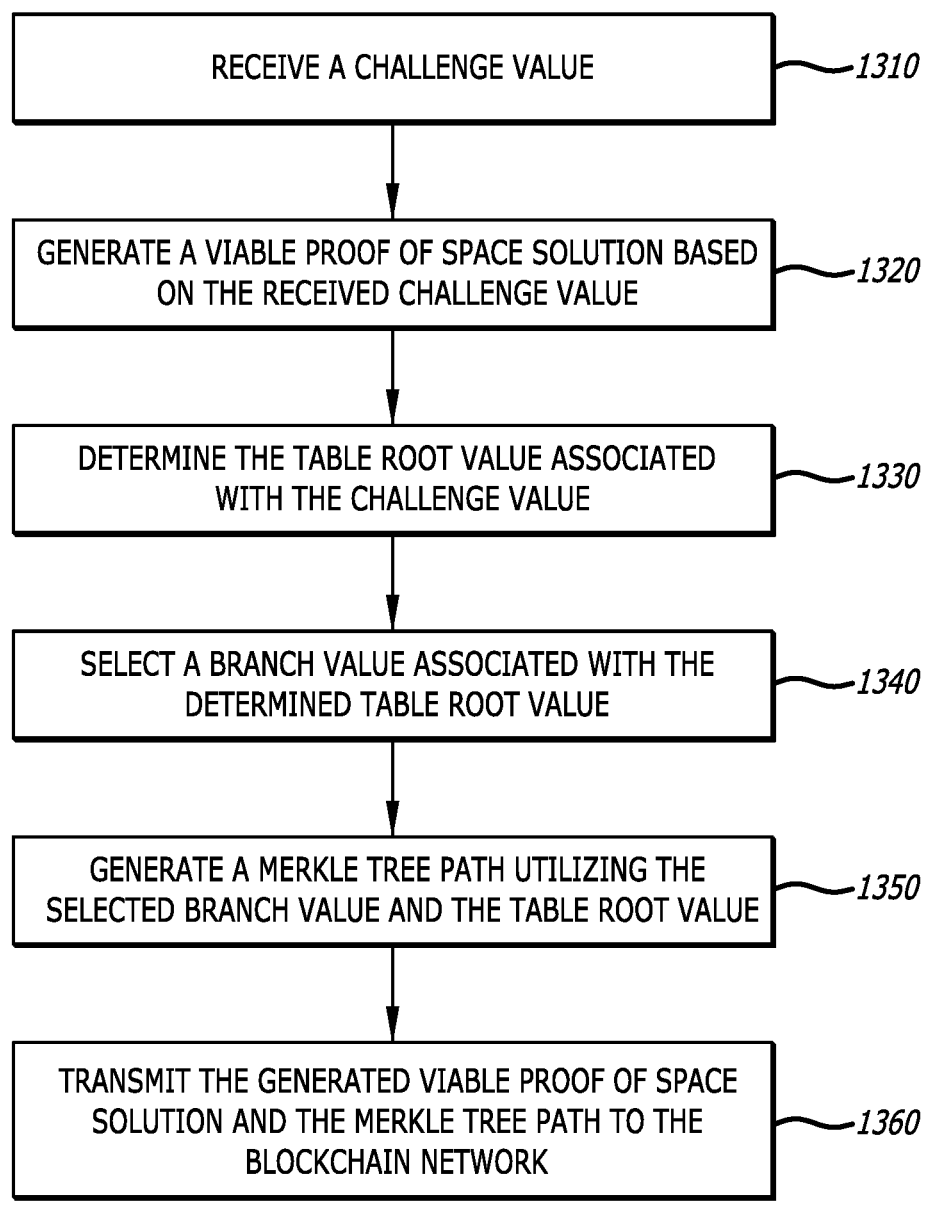
FIG. 13 is a flowchart depicting a process for utilizing a Merkle tree path for a challenge response in accordance with an embodiment of the disclosure.

Referring to FIG. 13, a flowchart depicting a process 1300 for utilizing a Merkle tree path for a challenge response in accordance with an embodiment of the disclosure is shown. In many embodiments, the Chia node will receive a challenge value (block 1310). In certain embodiments, the challenge value will be directly received within or from a blockchain challenge. In further embodiments, the challenge value can be derived from the received blockchain challenge data.

Typically, the challenge value will correspond in some fashion with a value within one of the entries in the last table of the plurality of tables within a Chia plot. This entry can be considered a root value that corresponds to a value in a previous table within the plurality of tables which itself references an entry in a previous table, and so on. Upon processing, a viable proof of space can be generated based on the received challenge value (block 1320). The process 1300 can determine the table root value associated with the challenge value (block 1330). This table root value can then be utilized to backpropagate throughout that branch to read all of the associated values within that branch. The process may then select a value within that branch associated with the determined table root value (block 1340). In many embodiments, the section of the value will be based on some property of the value in relation to other values within the branch. For example, the value selected may be the smallest value within the branch. However, it should be recognized that any other rule that selects a single value may be suitable such as selecting the largest value, the value closest to the table root value, etc.

Once the table root value and the selected branch value have been determined, the process 1300 can generate a Merkle tree path upon request (block 1350). In a number of embodiments, the request for a Merkle tree path is executed upon the generation of a valid proof of space solution based on the table root value. This can be done internally within the Chia node and does not require outside requests to occur. The generated Merkle tree path can, in many cases, include the associated hashes of other values and/or branches such that a recreation of the root hash value of the Merkle tree can be generated if the table root value and selected branch value are known.

Finally, the process 1300 can transmit the generated viable proof of space solution and the Merkle tree path to the blockchain network (block 1360). Once transmitted, the proof of space can be verified and the Merkle tree path can be checked to ensure that the data the solution was derived from previously existed within a storage space of the transmitting Chia network node. As discussed above, the exact data transmitted to the Chia blockchain network can include simply the corresponding hashes necessary to recreate the root hash value based on the given input leaf values. The transmission operations can be done via a Chia node that is connected to the Chia network. A device suitable for operating as a Chia node within the Chia blockchain network is described in more detail below.

Figure 14:
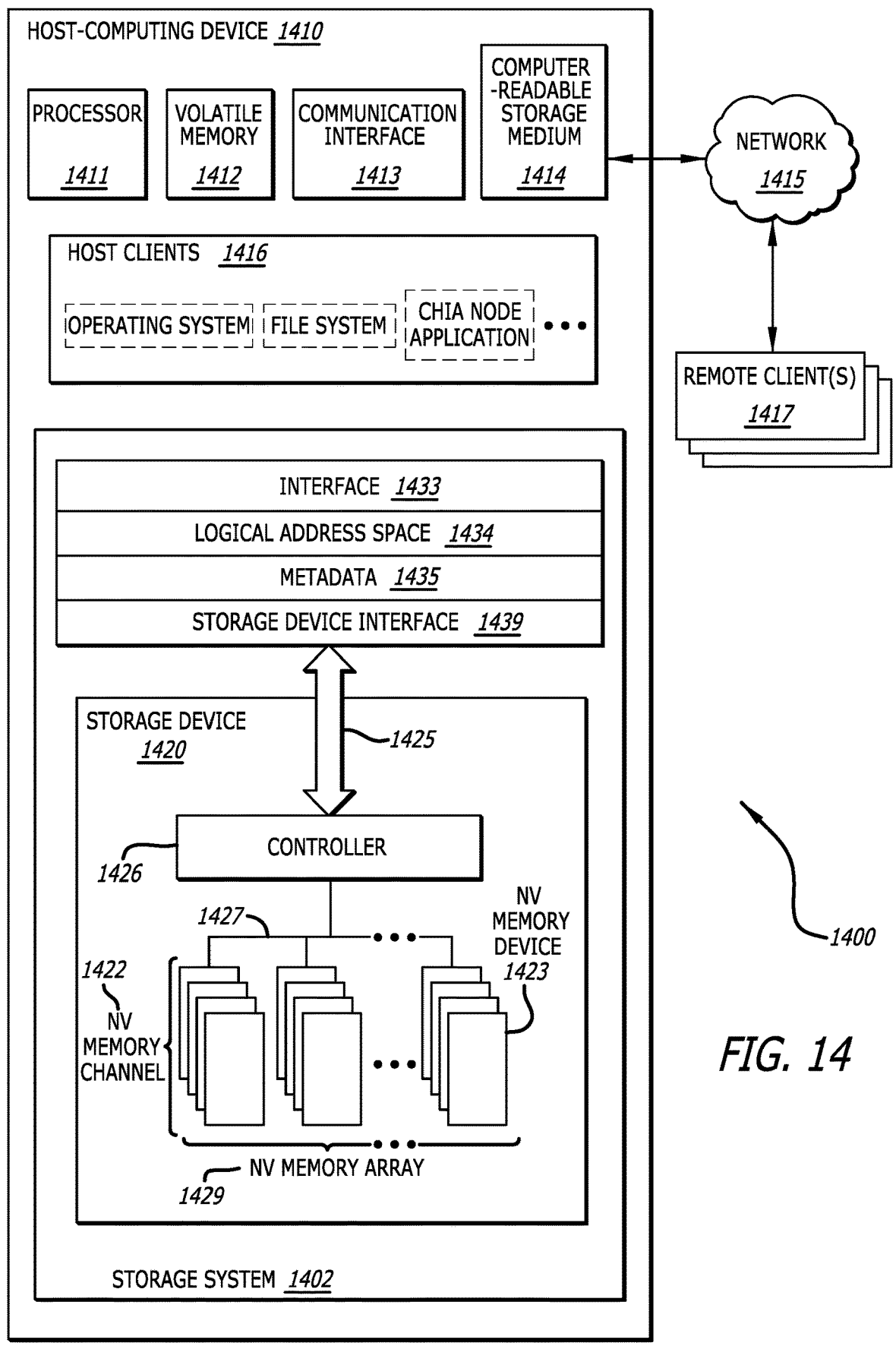
FIG. 14 is a schematic block diagram of a host-computing device suitable for proof of space consensus blockchain processing in accordance with an embodiment of the disclosure.

Referring to FIG. 14, a schematic block diagram of a host-computing device suitable for proof of space consensus blockchain processing in accordance with an embodiment of the disclosure is shown. The proof of space consensus blockchain system 1400 comprises one or more storage devices 1420 of a storage system 1402 within a host-computing device 1410 in communication via a controller 1426. The host-computing device 1410 may include a processor 1411, volatile memory 1412, and a communication interface 1413. The processor 1411 may include one or more central processing units, one or more general-purpose processors, one or more application-specific processors, one or more virtual processors (e.g., the host-computing device 1410 may be a virtual machine operating within a host), one or more processor cores, or the like. The communication interface 1413 may include one or more network interfaces configured to communicatively couple the host-computing device 1410 and/or controller 1426 of the storage device 1420 to a communication network such as an Internet Protocol (IP) network, a Storage Area Network (SAN), wireless network, wired network, or the like.

The storage device 1420, in various embodiments, may be disposed in one or more different locations relative to the host-computing device 1410. In one embodiment, the storage device 1420 comprises one or more non-volatile memory devices 1423, such as semiconductor chips or packages or other integrated circuit devices disposed on one or more printed circuit boards, storage housings, and/or other mechanical and/or electrical support structures. For example, the storage device 1420 may comprise one or more direct inline memory module (DIMM) cards, one or more expansion cards and/or daughter cards, a solid-state-drive (SSD) or other hard drive device, and/or may have another memory and/or storage form factor. The storage device 1420 may be integrated with and/or mounted on a motherboard of the host-computing device 1410, installed in a port and/or slot of the host-computing device 1410, installed on a different host-computing device 1410 and/or a dedicated storage appliance on the network 1415, in communication with the host-computing device 1410 over an external bus (e.g., an external hard drive), or the like.

The storage device 1420, in one embodiment, may be disposed on a memory bus of a processor 1411 (e.g., on the same memory bus as the volatile memory 1412, on a different memory bus from the volatile memory 1412, in place of the volatile memory 1412, or the like). In a further embodiment, the storage device 1420 may be disposed on a peripheral bus of the host-computing device 1410, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 1420 may be disposed on a communication network 1415, such as an Ethernet network, an Infiniband network, SCSI RDMA over a network 1415, a storage area network (SAN), a local area network (LAN), a wide area network (WAN) such as the Internet, another wired and/or wireless network 1415, or the like.

The host-computing device 1410 may further comprise a computer-readable storage medium 1414. The computer-readable storage medium 1414 may comprise executable instructions configured to cause the host-computing device 1410 (e.g., processor 1411) to perform steps of one or more of the methods disclosed herein. Additionally, or in the alternative, the buffering component 1450 may be embodied as one or more computer-readable instructions stored on the computer-readable storage medium 1414.

A device driver and/or the controller 1426, in certain embodiments, may present a logical address space 1434 to the host clients 1416. As used herein, a logical address space 1434 refers to a logical representation of memory resources. The logical address space 1434 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 1420 may maintain metadata 1435, such as a logical to physical address mapping structure, to map logical addresses of the logical address space 1434 to media storage locations on the storage device(s) 1420. A device driver may be configured to provide storage services to one or more host clients 1416. The host clients 1416 may include local clients operating on the host-computing device 1410 and/or remote clients 1417 accessible via the network 1415 and/or communication interface 1413. The host clients 1416 may include, but are not limited to: operating systems, file systems, database applications, server applications, kernel-level processes, user-level processes, applications, and the like. In many embodiments, the host client will be a proof of space blockchain logic that can make the host-computing device 1410 act as a node within a proof of space consensus blockchain network. The embodiments depicted in FIG. 14 comprises a Chia node application host client. This embodiment may thus be configured to act as a Chia node on the Chia blockchain network.

In many embodiments, the host-computing device 1410 can include a plurality of virtual machines which may be instantiated or otherwise created based on user-request. As will be understood by those skilled in the art, a host-computing device 1410 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 1416 that may utilize the storage system 1402 to store and access data.

The device driver may be further communicatively coupled to one or more storage systems 1402 which may include different types and configurations of storage devices 1420 including, but not limited to: solid-state storage devices, semiconductor storage devices, SAN storage resources, or the like. The one or more storage devices 1420 may comprise one or more respective controllers 1426 and non-volatile memory channels 1422. The device driver may provide access to the one or more storage devices 1420 via any compatible protocols or interface 1433 such as, but not limited to, SATA and PCIe. The metadata 1435 may be used to manage and/or track data operations performed through the protocols or interfaces 1433. The logical address space 1434 may comprise a plurality of logical addresses, each corresponding to respective media locations on the one or more storage devices 1420. The device driver may maintain metadata 1435 comprising any-to-any mappings between logical addresses and media locations. As those skilled in the art will recognize, the number of, and location of the storage devices may change as needed. For example, in Chia node applications, the number of storage devices may increase as additional plots are created and set up for access during farming operations.

A device driver may further comprise and/or be in communication with a storage device interface 1439 configured to transfer data, commands, and/or queries to the one or more storage devices 1420 over a bus 1425, which may include, but is not limited to: a memory bus of a processor 1411, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 1415, Infiniband, SCSI RDMA, or the like. The storage device interface 1439 may communicate with the one or more storage devices 1420 using input-output control (IO-CTL) command(s), IO-CTL command extension(s), remote direct memory access, or the like.

The storage system 1402 may further include a secure host memory buffer 1440. The secure host memory buffer 1440 may be configured to receive and store data from a storage device 1420. In this way, the secure host memory buffer 1440 can be configured as an external memory storage for the storage device 1420 which can be utilized for storing priority identifiers and their related protocols and/or data. In certain embodiments, the secure host memory buffer 1440 may be configured as a regular, non-secure memory buffer. In still further embodiments, the secure host memory buffer 1440 may be stored outside of the storage system 1402 and may be located within a different part of the host-computing device 1410. In still yet further embodiments, the secure host memory buffer 1440 may be located remotely as part of one or more remote clients 1417.

The communication interface 1413 may comprise one or more network interfaces configured to communicatively couple the host-computing device 1410 and/or the controller 1426 to a network 1415 and/or to one or more remote clients 1417 (which can act as another host). In many embodiments, the remote clients 1417 will be comprised of other proof of space consensus nodes within that respective blockchain network. For example, in the embodiment depicted in FIG. 14, the remote clients 117 may comprise other Chia nodes and/or timelords within the Chia network. The controller 1426 is part of and/or in communication with one or more storage devices 1420. Although FIG. 14 depicts a single storage device 1420, the disclosure is not limited in this regard and could be adapted to incorporate any number of storage devices 1420.

The storage device 1420 may comprise one or more non-volatile memory devices 1423 of non-volatile memory channels 1422, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 1423 of the non-volatile memory channels 1422, in certain embodiments, comprise storage class memory (SCM) (e.g., write in place memory, or the like).

While the non-volatile memory channels 1422 is referred to herein as "memory media," in various embodiments, the non-volatile memory channels 1422 may more generally comprise one or more non-volatile recording media capable of recording data, which may be referred to as a non-volatile memory medium, a non-volatile memory device, or the like. Further, the storage device 1420, in various embodiments, may comprise a non-volatile recording device, a non-volatile memory array 1429, a plurality of interconnected storage devices in an array, or the like.

The non-volatile memory channels 1422 may comprise one or more non-volatile memory devices 1423, which may include, but are not limited to: chips, packages, planes, die, or the like. A controller 1426 may be configured to manage data operations on the non-volatile memory channels 1422, and may comprise one or more processors, programmable processors (e.g., FPGAs), ASICs, micro-controllers, or the like. In some embodiments, the controller 1426 is configured to store data on and/or read data from the non-volatile memory channels 1422, to transfer data to/from the storage device 1420, and so on.

The controller 1426 may be communicatively coupled to the non-volatile memory channels 1422 by way of a bus 1427. The bus 1427 may comprise an I/O bus for communicating data to/from the non-volatile memory devices 1423. The bus 1427 may further comprise a control bus for communicating addressing and other command and control information to the non-volatile memory devices 1423. In some embodiments, the bus 1427 may communicatively couple the non-volatile memory devices 1423 to the controller 1426 in parallel. This parallel access may allow the non-volatile memory devices 1423 to be managed as a group, forming a non-volatile memory array 1429. The non-volatile memory devices 1423 may be partitioned into respective logical memory units (e.g., logical pages) and/or logical memory divisions (e.g., logical blocks). The logical memory units may be formed by logically combining physical memory units of each of the non-volatile memory devices 1423.

The controller 1426 may organize a block of word lines within a non-volatile memory device 1423, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 1423 may be physically arranged in a monotonically increasing sequence of word line addresses, with consecutively addressed word lines also being physically adjacent (e.g., WL0, WL1, WL2, . . . . WLN).

The controller 1426 may comprise and/or be in communication with a device driver executing on the host-computing device 1410. A device driver may provide storage services to the host clients 1416 via one or more interfaces 1433. A device driver may further comprise a storage device interface 1439 that is configured to transfer data, commands, and/or queries to the controller 1426 over a bus 1425, as described above.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method for filtering challenge solutions in a proof of space consensus blockchain network, comprising:
   generating one or more plots wherein a Merkle tree is incorporated into the plot;
   generating a unique plot identification value for each generated plot;
   generating commitment data based on the incorporated Merkle tree;
   registering the plot identification value and commitment data to the blockchain;
   generating a quality string value to determine an overall proof of quality of the plot;
   upon receiving challenge data from the blockchain network, generating a plurality of potential solutions if the overall proof of quality of the plot is above a predetermined threshold;
   filtering the generated potential solutions wherein the filter evaluates a hash value generated from a combination of:
   the plot identification value;
   the received challenge data;
   signage point data received from the blockchain network; and
   the generated commitment data.

2. The method of claim 1, wherein a plot includes at least a plurality of ordered tables.

3. The method of claim 2, wherein the second through last table of the plurality of tables comprise values that reference locations within previous tables such that selecting a first value in the last ordered table will backpropagate through a series of values until a final value is reached within the first table.

4. The method of claim 3, wherein the incorporated Merkle tree has input leaf values comprised of a pair of numbers.

5. The method of claim 4, wherein the first value of the pair of leaf values comprises a value stored in the last of the plurality of ordered tables.

6. The method of claim 5, wherein the second value of the pair of leaf values comprises a value derived from the first value within the plurality of tables.

7. The method of claim 6, wherein the second value is the smallest value within the series of values within the back-propagation of the first value within the plurality of tables.

8. The method of claim 7, wherein the commitment data is the value of the root of the incorporated Merkle tree.

9. The method of claim 7, wherein the potential solutions are formatted to be associated with the commitment data.

10. The method of claim 9, wherein the potential solution includes a Merkle tree path generated from the incorporated Merkle tree.

11. The method of claim 10, wherein the Merkle tree path is generated from the first and second values of the input leaves.

12. The method of claim 1, wherein the filtering evaluation comprises determining the number of leading zeros within the resulting hash.

13. The method of claim 9, wherein the filter will reject any potential challenge solutions that do not comprise a value with an equal or greater number of required leading zeros.

14. The method of claim 1, wherein filtering potential solutions further includes evaluating the duration between plot registration and submitting the solution.

15. The method of claim 11, wherein potential solutions will be rejected if the time elapsed between plot registration and submission of the potential solution does not exceed a second predetermined threshold.

16. The method of claim 15, wherein the second predetermined threshold is associated with the height of the current block within the blockchain.

17. A device comprising:
a processor;
a memory array comprising:
 a plurality of memory devices;
a proof of space blockchain logic configured to:
 generate one or more plots wherein a Merkle tree is incorporated into the plot;
 store the plots within the memory array;
 generate a unique plot identification value for each generated plot;
 generate commitment data based on the incorporated Merkle tree;
 register the plot identification value and commitment data to the blockchain;
 generate a quality string value to determine an overall proof of quality of the plot;
 upon receiving challenge data from the blockchain network, generating a plurality of potential solutions if the overall proof of quality of the plot is above a predetermined threshold;
 filter the generated potential solutions wherein the filter evaluates a hash value generated from a combination of:
  the plot identification value;
  the received challenge data;
  signage point data received from the blockchain network; and
  the generated commitment data.

18. The device of claim 17, wherein the filtering evaluation comprises determining the number of leading zeros within the resulting hash.

19. The device of claim 17, wherein the filter will reject any potential challenge solutions that do not comprise a value with an equal or greater number of required leading zeros.

20. The device of claim 17, wherein the number of required leading zeroes can be dynamically changed upon the next received challenge data.

\* \* \* \* \*